(12) United States Patent
Ostdiek et al.

(10) Patent No.: US 11,756,392 B2
(45) Date of Patent: *Sep. 12, 2023

(54) PORTABLE ELECTRONIC DEVICE HAVING A HAPTIC BUTTON ASSEMBLY

(71) Applicant: Apple Inc., Cupertino, CA (US)

(72) Inventors: Jared P. Ostdiek, Santa Clara, CA (US); Jesse P. Harris, Saratoga, CA (US); Richard H. Koch, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/332,795

(22) Filed: May 27, 2021

(65) Prior Publication Data

US 2021/0398403 A1   Dec. 23, 2021

Related U.S. Application Data

(63) Continuation of application No. 16/904,409, filed on Jun. 17, 2020, now Pat. No. 11,024,135.

(51) Int. Cl.
  *G08B 6/00* (2006.01)
  *G09B 21/00* (2006.01)
  *H04B 3/36* (2006.01)

(52) U.S. Cl.
  CPC ..................... *G08B 6/00* (2013.01)

(58) Field of Classification Search
  CPC .......... G08B 6/00; H02K 7/075; H02K 11/25; G04G 21/08; G04G 21/025; G04G 17/02;
  (Continued)

(56) References Cited

U.S. PATENT DOCUMENTS

| 5,196,745 A | 3/1993 | Trumper et al. |
| 5,293,161 A | 3/1994 | MacDonald et al. |

(Continued)

FOREIGN PATENT DOCUMENTS

| CN | 1846179 | 10/2006 |
| CN | 101036105 | 9/2007 |

(Continued)

OTHER PUBLICATIONS

U.S. Appl. No. 17/145,115, filed Jan. 8, 2021, Bushnell et al.

(Continued)

*Primary Examiner* — Toan N Pham
(74) *Attorney, Agent, or Firm* — Brownstein Hyatt Farber Schreck, LLP

(57) ABSTRACT

A haptic button assembly may be used for detecting inputs and providing haptic outputs at an electronic device. The haptic outputs may be provided in response to detected inputs or in response to other conditions at the electronic device. The haptic button assembly may define an input surface along an exterior of the electronic device. Inputs may be provided to the input surface of the haptic button assembly. An input may include a touch input on or along the input surface and/or a force input directed substantially perpendicularly to the input surface. The haptic button assembly may provide a haptic output by moving an input member of the haptic button assembly laterally (e.g., substantially parallel to the input surface).

20 Claims, 9 Drawing Sheets

(58) Field of Classification Search
CPC .... H03K 17/96; H05K 5/0017; H01F 7/0205; H01F 7/1646
See application file for complete search history.

(56) References Cited

U.S. PATENT DOCUMENTS

| | | | |
|---|---|---|---|
| 5,424,756 A | 6/1995 | Ho et al. |
| 5,434,549 A | 7/1995 | Hirabayashi et al. |
| 5,436,622 A | 7/1995 | Gutman et al. |
| 5,668,423 A | 9/1997 | You et al. |
| 5,842,967 A | 1/1998 | Kroll |
| 5,739,759 A | 4/1998 | Nakazawa et al. |
| 6,084,319 A | 7/2000 | Kamata et al. |
| 6,342,880 B2 | 1/2002 | Rosenberg et al. |
| 6,373,465 B2 | 4/2002 | Jolly et al. |
| 6,388,789 B1 | 5/2002 | Bernstein |
| 6,438,393 B1 | 8/2002 | Surronen |
| 6,445,093 B1 | 9/2002 | Binnard |
| 6,493,612 B1 | 12/2002 | Bisset et al. |
| 6,554,191 B2 | 4/2003 | Yoneya |
| 6,693,622 B1 | 2/2004 | Shahoian et al. |
| 6,777,895 B2 | 8/2004 | Shimoda et al. |
| 6,822,635 B2 | 11/2004 | Shahoian |
| 6,864,877 B2 | 3/2005 | Braun et al. |
| 6,952,203 B2 | 10/2005 | Banerjee et al. |
| 6,988,414 B2 | 1/2006 | Ruhrig et al. |
| 7,068,168 B2 | 6/2006 | Girshovich et al. |
| 7,080,271 B2 | 7/2006 | Kardach et al. |
| 7,126,254 B2 | 10/2006 | Nanataki et al. |
| 7,130,664 B1 | 10/2006 | Williams |
| 7,196,688 B2 | 3/2007 | Shena et al. |
| 7,202,851 B2 | 4/2007 | Cunningham et al. |
| 7,234,379 B2 | 6/2007 | Claesson et al. |
| 7,253,350 B2 | 8/2007 | Noro et al. |
| 7,276,907 B2 | 10/2007 | Kitagawa et al. |
| 7,321,180 B2 | 1/2008 | Takeuchi et al. |
| 7,323,959 B2 | 1/2008 | Naka et al. |
| 7,336,006 B2 | 2/2008 | Watanabe et al. |
| 7,339,572 B2 | 3/2008 | Schena |
| 7,355,305 B2 | 4/2008 | Nakamura et al. |
| 7,360,446 B2 | 4/2008 | Dai et al. |
| 7,370,289 B1 | 5/2008 | Ebert et al. |
| 7,385,874 B2 | 6/2008 | Vuilleumier |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,576,477 B2 | 8/2009 | Koizumi |
| 7,656,388 B2 | 2/2010 | Schena et al. |
| 7,667,371 B2 | 2/2010 | Sadler et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,911,328 B2 | 3/2011 | Luden et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,020,266 B2 | 9/2011 | Ulm et al. |
| 8,040,224 B2 | 10/2011 | Hwang |
| 8,053,688 B2 | 11/2011 | Conzola et al. |
| 8,063,892 B2 | 11/2011 | Shahoian |
| 8,072,418 B2 | 12/2011 | Crawford et al. |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,174,512 B2 | 5/2012 | Ramstein et al. |
| 8,188,989 B2 | 5/2012 | Levin |
| 8,169,402 B2 | 6/2012 | Shahoian et al. |
| 8,217,892 B2 | 7/2012 | Meadors |
| 8,217,910 B2 | 7/2012 | Stallings et al. |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,264,465 B2 | 9/2012 | Grant et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,572 B2 | 3/2013 | Marsden et al. |
| 8,390,594 B2 | 3/2013 | Modarres et al. |
| 8,400,027 B2 | 3/2013 | Dong et al. |
| 8,405,618 B2 | 3/2013 | Colgate et al. |
| 8,421,609 B2 | 4/2013 | Kim et al. |
| 8,432,365 B2 | 4/2013 | Kim et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,562,489 B2 | 10/2013 | Burton |
| 8,576,171 B2 | 11/2013 | Grant |
| 8,598,750 B2 | 12/2013 | Park |
| 8,598,972 B2 | 12/2013 | Cho et al. |
| 8,604,670 B2 | 12/2013 | Mahameed et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,628,173 B2 | 1/2014 | Stephens et al. |
| 8,633,916 B2 | 1/2014 | Bernstein et al. |
| 8,639,485 B2 | 1/2014 | Connacher et al. |
| 8,643,480 B2 | 2/2014 | Maier et al. |
| 8,648,829 B2 | 2/2014 | Shahoian et al. |
| 8,653,785 B2 | 2/2014 | Collopy |
| 8,654,524 B2 | 2/2014 | Pance et al. |
| 8,681,130 B2 | 3/2014 | Adhikari |
| 8,686,952 B2 | 4/2014 | Burrough et al. |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,780,074 B2 | 7/2014 | Castillo et al. |
| 8,797,153 B2 | 8/2014 | Vanhelle et al. |
| 8,797,295 B2 | 8/2014 | Bernstein et al. |
| 8,803,670 B2 | 8/2014 | Steckel et al. |
| 8,834,390 B2 | 9/2014 | Couvillon |
| 8,836,502 B2 | 9/2014 | Culbert et al. |
| 8,836,643 B2 | 9/2014 | Romera Joliff et al. |
| 8,867,757 B1 | 10/2014 | Ooi |
| 8,872,448 B2 | 10/2014 | Boldyrev et al. |
| 8,878,401 B2 | 11/2014 | Lee |
| 8,890,824 B2 | 11/2014 | Guard |
| 8,907,661 B2 | 12/2014 | Maier et al. |
| 8,976,139 B2 | 3/2015 | Koga et al. |
| 8,976,141 B2 | 3/2015 | Myers et al. |
| 8,977,376 B1 | 3/2015 | Lin et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,046,947 B2 | 6/2015 | Takeda |
| 9,049,339 B2 | 6/2015 | Muench |
| 9,052,785 B2 | 6/2015 | Horie |
| 9,054,605 B2 | 6/2015 | Jung et al. |

(56) References Cited

U.S. PATENT DOCUMENTS

| | | |
|---|---|---|
| 9,058,077 B2 | 6/2015 | Lazaridis et al. |
| 9,086,727 B2 | 7/2015 | Tidemand et al. |
| 9,092,056 B2 | 7/2015 | Myers et al. |
| 9,094,762 B2 | 7/2015 | Wong et al. |
| 9,104,285 B2 | 8/2015 | Colgate et al. |
| 9,116,570 B2 | 8/2015 | Lee et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,182,837 B2 | 11/2015 | Day |
| 9,218,727 B2 | 12/2015 | Rothkopf et al. |
| 9,228,908 B2 | 1/2016 | Aliane et al. |
| 9,245,704 B2 | 1/2016 | Maharjan et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,285,905 B1 | 3/2016 | Buuck et al. |
| 9,286,907 B2 | 3/2016 | Yang et al. |
| 9,304,587 B2 | 4/2016 | Wright et al. |
| 9,319,150 B2 | 4/2016 | Peeler et al. |
| 9,348,414 B2 | 5/2016 | Kagayama |
| 9,348,473 B2 | 5/2016 | Ando |
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |
| 9,442,570 B2 | 9/2016 | Slonneger |
| 9,448,631 B2 | 9/2016 | Winter et al. |
| 9,448,713 B2 | 9/2016 | Cruz-Hernandez et al. |
| 9,449,476 B2 | 9/2016 | Lynn et al. |
| 9,459,734 B2 | 10/2016 | Day |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,513,704 B2 | 12/2016 | Heubel et al. |
| 9,519,346 B2 | 12/2016 | Lacroix et al. |
| 9,535,500 B2 | 1/2017 | Pasquero et al. |
| 9,539,164 B2 | 1/2017 | Sanders et al. |
| 9,542,028 B2 | 1/2017 | Filiz et al. |
| 9,557,830 B2 | 1/2017 | Grant |
| 9,557,857 B2 | 1/2017 | Schediwy |
| 9,563,274 B2 | 2/2017 | Senanayake |
| 9,564,029 B2 | 2/2017 | Morrell et al. |
| 9,594,429 B2 | 3/2017 | Bard et al. |
| 9,600,037 B2 | 3/2017 | Pance et al. |
| 9,600,071 B2 | 3/2017 | Rothkopf |
| 9,607,491 B1 | 3/2017 | Mortimer et al. |
| 9,627,163 B2 | 4/2017 | Ely et al. |
| 9,632,583 B2 | 4/2017 | Virtanen et al. |
| 9,639,158 B2 | 5/2017 | Levesque et al. |
| 9,666,040 B2 | 5/2017 | Flaherty et al. |
| 9,707,593 B2 | 7/2017 | Berte |
| 9,710,061 B2 | 7/2017 | Pance et al. |
| 9,727,238 B2 | 8/2017 | Peh et al. |
| 9,733,704 B2 | 8/2017 | Cruz-Hernandez et al. |
| 9,762,236 B2 | 9/2017 | Chen et al. |
| 9,823,828 B2 | 11/2017 | Zambetti et al. |
| 9,829,981 B1 | 11/2017 | Ji |
| 9,830,782 B2 | 11/2017 | Morrell et al. |
| 9,857,872 B2 | 1/2018 | Terlizzi et al. |
| 9,870,053 B2 | 1/2018 | Modarres et al. |
| 9,874,980 B2 | 1/2018 | Brunet et al. |
| 9,875,625 B2 | 1/2018 | Khoshkava et al. |
| 9,878,239 B2 | 1/2018 | Heubel et al. |
| 9,886,057 B2 | 2/2018 | Bushnell et al. |
| 9,886,090 B2 | 2/2018 | Silvanto et al. |
| 9,902,186 B2 | 2/2018 | Whiteman et al. |
| 9,904,393 B2 | 2/2018 | Frey et al. |
| 9,921,649 B2 | 3/2018 | Grant et al. |
| 9,927,887 B2 | 3/2018 | Bulea |
| 9,927,902 B2 | 3/2018 | Burr et al. |
| 9,928,950 B2 | 3/2018 | Lubinski et al. |
| 9,940,013 B2 | 4/2018 | Choi et al. |
| 9,971,407 B2 | 5/2018 | Holenarsipur et al. |
| 9,977,499 B2 | 5/2018 | Westerman et al. |
| 9,990,040 B2 | 6/2018 | Levesque |
| 9,996,199 B2 | 6/2018 | Park et al. |
| 10,025,399 B2 | 7/2018 | Kim et al. |
| 10,032,550 B1 | 7/2018 | Zhang et al. |
| 10,037,660 B2 | 7/2018 | Khoshkava et al. |
| 10,061,385 B2 | 8/2018 | Churikov et al. |
| 10,069,392 B2 | 9/2018 | Degner et al. |
| 10,078,483 B2 | 9/2018 | Finnan et al. |
| 10,082,873 B2 | 9/2018 | Zhang |
| 10,108,265 B2 | 10/2018 | Harley et al. |
| 10,110,986 B1 | 10/2018 | Min |
| 10,120,446 B2 | 11/2018 | Pance et al. |
| 10,120,478 B2 | 11/2018 | Filiz et al. |
| 10,120,484 B2 | 11/2018 | Endo et al. |
| 10,122,184 B2 | 11/2018 | Smadi et al. |
| 10,133,351 B2 | 11/2018 | Weber et al. |
| 10,139,976 B2 | 11/2018 | Iuchi et al. |
| 10,146,336 B2 | 12/2018 | Lee et al. |
| 10,152,131 B2 | 12/2018 | Grant et al. |
| 10,152,182 B2 | 12/2018 | Haran et al. |
| 10,203,762 B2 | 2/2019 | Bradski et al. |
| 10,209,821 B2 | 2/2019 | Roberts-Hoffman et al. |
| 10,232,714 B2 | 3/2019 | Wachinger |
| 10,235,034 B2 | 3/2019 | Jitkoff et al. |
| 10,235,849 B1 | 3/2019 | Levesque |
| 10,248,221 B2 | 4/2019 | Pance et al. |
| 10,254,840 B2 | 4/2019 | Weinraub |
| 10,261,585 B2 | 4/2019 | Bard et al. |
| 10,275,075 B2 | 4/2019 | Hwang et al. |
| 10,282,014 B2 | 5/2019 | Butler et al. |
| 10,284,935 B2 | 5/2019 | Miyoshi |
| 10,289,199 B2 | 5/2019 | Hoellwarth |
| 10,343,061 B2 | 7/2019 | Billington et al. |
| 10,346,117 B2 | 7/2019 | Sylvan et al. |
| 10,372,214 B1 | 8/2019 | Gleeson et al. |
| 10,373,381 B2 | 8/2019 | Nuernberger et al. |
| 10,382,866 B2 | 8/2019 | Min |
| 10,390,139 B2 | 8/2019 | Biggs |
| 10,394,326 B2 | 8/2019 | Ono et al. |
| 10,397,686 B2 | 8/2019 | Forstner et al. |
| 10,430,077 B2 | 10/2019 | Lee |
| 10,437,359 B1 | 10/2019 | Wang et al. |
| 10,459,226 B2 | 10/2019 | Leppanen et al. |
| 10,531,191 B2 | 1/2020 | Macours |
| 10,556,252 B2 | 2/2020 | Tsang et al. |
| 10,564,721 B2 | 2/2020 | Cruz-Hernandez et al. |
| 10,585,480 B1 | 3/2020 | Bushnell et al. |
| 10,591,993 B2 | 3/2020 | Lehmann et al. |
| 10,599,223 B1 | 3/2020 | Amin-Shahidi et al. |
| 10,622,538 B2 | 4/2020 | Zhang et al. |
| 10,649,529 B1 | 5/2020 | Nekimken et al. |
| 10,685,626 B2 | 6/2020 | Kim et al. |
| 10,691,211 B2 | 6/2020 | Amin-Shahidi et al. |
| 10,768,738 B1 | 9/2020 | Wang et al. |
| 10,768,747 B2 | 9/2020 | Wang et al. |
| 10,775,889 B1 | 9/2020 | Lehmann et al. |
| 10,809,830 B2 | 10/2020 | Kim et al. |
| 10,845,220 B2 | 11/2020 | Song et al. |
| 10,845,878 B1 | 11/2020 | Zhao et al. |
| 10,890,978 B2 | 1/2021 | Bushnell et al. |
| 10,936,071 B2 | 3/2021 | Pandya et al. |
| 10,942,571 B2 | 3/2021 | Hendren et al. |
| 10,963,117 B2 | 3/2021 | Morrell et al. |
| 10,996,007 B2 | 3/2021 | Fenner et al. |
| 11,024,135 B1* | 6/2021 | Ostdiek .......... G08B 6/00 |
| 11,054,932 B2 | 7/2021 | Xu et al. |
| 11,188,151 B2 | 11/2021 | Bushnell et al. |
| 2003/0117132 A1 | 6/2003 | Klinghult |
| 2005/0036603 A1 | 2/2005 | Hughes |
| 2005/0191604 A1 | 9/2005 | Allen |
| 2005/0230594 A1 | 10/2005 | Sato et al. |
| 2006/0017691 A1 | 1/2006 | Cruz-Hernandez et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |

(56) References Cited

U.S. PATENT DOCUMENTS

| | | |
|---|---|---|
| 2008/0062624 A1 | 3/2008 | Regen |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0166098 A1 | 7/2009 | Sunder |
| 2009/0167702 A1 | 7/2009 | Nurmi |
| 2009/0174672 A1 | 7/2009 | Schmidt |
| 2009/0207129 A1 | 8/2009 | Ullrich et al. |
| 2009/0225046 A1 | 9/2009 | Kim et al. |
| 2009/0243404 A1 | 10/2009 | Kim et al. |
| 2009/0267892 A1 | 10/2009 | Faubert |
| 2010/0116629 A1 | 5/2010 | Borissov et al. |
| 2010/0225600 A1 | 9/2010 | Dai et al. |
| 2010/0313425 A1 | 12/2010 | Hawes |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0169347 A1 | 7/2011 | Miyamoto et al. |
| 2011/0205038 A1 | 8/2011 | Drouin et al. |
| 2011/0261021 A1 | 10/2011 | Modarres et al. |
| 2011/0267294 A1 | 11/2011 | Kildal |
| 2012/0038469 A1 | 2/2012 | Dehmoubed et al. |
| 2012/0038471 A1 | 2/2012 | Kim et al. |
| 2012/0056825 A1 | 3/2012 | Ramsay et al. |
| 2012/0062491 A1 | 3/2012 | Coni et al. |
| 2012/0113008 A1 | 5/2012 | Makinen et al. |
| 2012/0235942 A1 | 9/2012 | Shahoian |
| 2012/0249474 A1 | 10/2012 | Pratt et al. |
| 2012/0327006 A1 | 12/2012 | Israr et al. |
| 2013/0016042 A1 | 1/2013 | Makinen et al. |
| 2013/0021296 A1 | 1/2013 | Min et al. |
| 2013/0043670 A1 | 2/2013 | Holmes |
| 2013/0044049 A1 | 2/2013 | Biggs et al. |
| 2013/0076635 A1 | 3/2013 | Lin |
| 2013/0154996 A1 | 6/2013 | Trend et al. |
| 2013/0207793 A1 | 8/2013 | Weaber et al. |
| 2014/0118419 A1 | 5/2014 | Wu et al. |
| 2014/0125470 A1 | 5/2014 | Rosenberg |
| 2014/0168175 A1 | 6/2014 | Mercea et al. |
| 2015/0084909 A1 | 3/2015 | Worfolk et al. |
| 2015/0126070 A1 | 5/2015 | Candelore |
| 2015/0182113 A1 | 7/2015 | Utter, II |
| 2015/0185842 A1 | 7/2015 | Picciotto et al. |
| 2015/0186609 A1 | 7/2015 | Utter, II |
| 2015/0234493 A1 | 8/2015 | Parivar et al. |
| 2015/0293592 A1 | 10/2015 | Cheong et al. |
| 2016/0171767 A1 | 6/2016 | Anderson |
| 2016/0253019 A1 | 9/2016 | Geaghan |
| 2016/0293829 A1 | 10/2016 | Maharjan et al. |
| 2016/0327911 A1 | 11/2016 | Eim et al. |
| 2016/0328930 A1 | 11/2016 | Weber et al. |
| 2016/0334901 A1 | 11/2016 | Rihn |
| 2016/0379776 A1 | 12/2016 | Oakley |
| 2017/0024010 A1 | 1/2017 | Weinraub |
| 2017/0090655 A1 | 3/2017 | Zhang et al. |
| 2017/0249024 A1 | 8/2017 | Jackson et al. |
| 2017/0336273 A1 | 11/2017 | Elangovan et al. |
| 2017/0357325 A1 | 12/2017 | Yang et al. |
| 2017/0364158 A1 | 12/2017 | Wen et al. |
| 2018/0005496 A1 | 1/2018 | Dogiamis et al. |
| 2018/0015362 A1 | 1/2018 | Terahata |
| 2018/0029078 A1 | 2/2018 | Park et al. |
| 2018/0284894 A1 | 10/2018 | Raut et al. |
| 2018/0321841 A1 | 11/2018 | Lapp |
| 2018/0335883 A1 | 11/2018 | Choi et al. |
| 2019/0073079 A1 | 3/2019 | Xu et al. |
| 2019/0278232 A1 | 9/2019 | Ely et al. |
| 2019/0310724 A1 | 10/2019 | Yazdandoost et al. |
| 2020/0251648 A1 | 8/2020 | Fukumoto |
| 2021/0157411 A1 | 5/2021 | Bushnell et al. |
| 2021/0176548 A1 | 6/2021 | Fenner et al. |
| 2021/0325993 A1 | 10/2021 | Xu et al. |

FOREIGN PATENT DOCUMENTS

| | | |
|---|---|---|
| CN | 201044066 | 4/2008 |
| CN | 101409164 | 4/2009 |
| CN | 101436099 | 5/2009 |
| CN | 101663104 | 3/2010 |
| CN | 101872257 | 10/2010 |
| CN | 201897778 | 7/2011 |
| CN | 201945951 | 8/2011 |
| CN | 102349039 | 2/2012 |
| CN | 102448555 | 5/2012 |
| CN | 203405773 | 1/2014 |
| CN | 203630729 | 6/2014 |
| CN | 104679233 | 6/2015 |
| CN | 105144052 | 12/2015 |
| CN | 106104448 | 11/2016 |
| CN | 106133650 | 11/2016 |
| CN | 106354203 | 1/2017 |
| CN | 206339935 | 7/2017 |
| CN | 107305452 | 10/2017 |
| CN | 107557280 | 1/2018 |
| CN | 207115337 | 3/2018 |
| CN | 107966895 | 4/2018 |
| DE | 214030 | 3/1983 |
| EP | 1686776 | 8/2006 |
| EP | 2743798 | 6/2014 |
| EP | 3098690 | 11/2016 |
| JP | 2004129120 | 4/2004 |
| JP | 2004236202 | 8/2004 |
| JP | 2010537279 | 12/2010 |
| JP | 2010540320 | 12/2010 |
| JP | 2012048378 | 3/2012 |
| KR | 20050033909 | 4/2005 |
| KR | 101016208 | 2/2011 |
| KR | 20130137124 | 12/2013 |
| KR | 20160017070 | 2/2016 |
| KR | 20160131275 | 11/2016 |
| KR | 20170107570 | 9/2017 |
| TW | 2010035805 | 10/2010 |
| TW | 201430623 | 8/2014 |
| WO | WO 2002/073587 | 9/2002 |
| WO | WO 2006/091494 | 8/2006 |
| WO | WO 2007/049253 | 5/2007 |
| WO | WO 2007/114631 | 10/2007 |
| WO | WO 2009/038862 | 3/2009 |
| WO | WO 2009/156145 | 12/2009 |
| WO | WO 10/129221 | 11/2010 |
| WO | WO 2010/129892 | 11/2010 |
| WO | WO 12/173818 | 12/2012 |
| WO | WO 2013/169303 | 11/2013 |
| WO | WO 2014/066516 | 5/2014 |
| WO | WO 2014/200766 | 12/2014 |
| WO | WO 2016/091944 | 6/2016 |
| WO | WO 2016/144563 | 9/2016 |
| WO | WO 19/003254 | 1/2019 |

OTHER PUBLICATIONS

U.S. Appl. No. 17/180,957, filed Feb. 22, 2021, Fenner et al.
U.S. Appl. No. 17/845,872, filed Jun. 21, 2022, Liang et al.
U.S. Appl. No. 17/899,117, filed Aug. 30, 2022, Lehmann et al.
Author Unknown, "3D Printed Mini Haptic Actuator, Autodesk, Inc., 16 pages, 2016."
Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.
Hill et al., "Real-time Estimation of Human Impedance for Haptic Interfaces," Stanford Telerobotics Laboratory, Department of Mechanical Engineering, Standford University, 6 pages, at least as early as Sep. 30, 2009.
Lee et al, "Haptic Pen: Tactile Feedback Stylus for Touch Screens," Mitsubishi Electric Research Laboratories, http://wwwlmerl.com, 6 pages, Oct. 2004.
Stein et al., "A process chain for integrating piezoelectric transducers into aluminum die castings to generate smart lightweight structures," Results in Physics 7, pp. 2534-2539, 2017.

(56) References Cited

OTHER PUBLICATIONS

"Lofelt at Smart Haptics 2017," Auto-generated transcript from YouTube video clip, uploaded on Jun. 12, 2018 by user "Lofelt," Retrieved from Internet: <https://www.youtube.com/watch?v=3w7LTQkS430>, 3 pages.

"Tutorial: Haptic Feedback Using Music and Audio—Precision Microdrives," Retrieved from Internet Nov. 13, 2019: https://www.precisionmicrodrives.com/haptic-feedback/tutorial-haptic-feedback-using-music-and-audio/, 9 pages.

"Feel what you hear: haptic feedback as an accompaniment to mobile music playback," Retrieved from Internet Nov. 13, 2019: https://dl.acm.org/citation.cfm?id=2019336, 2 pages.

"Auto Haptic Widget for Android," Retrieved from Internet Nov. 13, 2019, https://apkpure.com/auto-haptic-widget/com.immersion.android.autohaptic, 3 pages.

D-Box Home, Retrieved from Internet Nov. 12, 2019: https://web.archive.org/web/20180922193345/https://www.d-box.com/en, 4 pages.

\* cited by examiner

PORTABLE ELECTRONIC DEVICE HAVING A HAPTIC BUTTON ASSEMBLY

CROSS-REFERENCE TO RELATED APPLICATION

This application is a continuation of U.S. patent application Ser. No. 16/904,409, filed Jun. 17, 2020, now U.S. Pat. No. 11,024,135, the contents of which are incorporated herein by reference as if fully disclosed herein.

FIELD

Embodiments relate generally to an electronic watch or other electronic device. More particularly, the described embodiments relate to haptic button assemblies configured to receive inputs and provide haptic outputs at an electronic device.

BACKGROUND

Typically, electronic devices include various buttons or input devices that are used to control the device or provide user input. However, traditional electromagnetic buttons may require a significant amount of space and provide limited functionality. The input devices and techniques described herein are directed to an input device that includes an integrated haptic mechanism that is configured to produce a tactile or perceptible feedback to a user when operating the input device.

SUMMARY

Embodiments of the systems, devices, methods, and apparatuses described in the present disclosure are directed to haptic button assemblies configured to receive inputs and provide haptic outputs at an electronic device.

One embodiment may take the form of an electronic device. The electronic device may include an enclosure, a haptic button assembly, and a processing unit. The enclosure may include a sidewall that defines an opening. The haptic button assembly may include an input member positioned within the opening and defining an input surface. The haptic button assembly may further include an input sensor configured to detect an input applied to the input surface. The haptic button assembly may further include a magnetic component positioned in the enclosure and coupled to the input member. The magnetic component may be configured to generate a magnetic flux. The haptic button assembly may further include a conduction loop having a conductive segment configured to conduct an electrical current through the magnetic flux in a direction that is transverse to a local flux direction of the magnetic flux. The processing unit may be positioned in the enclosure and configured to, in response to the input sensor detecting the input, cause the electrical current to conduct through the conduction loop, causing a lateral translation of the input member in a translation direction that is substantially parallel to the input surface, thereby producing a haptic output.

Another embodiment may take the form of a haptic button assembly for an electronic device. The haptic button assembly may include an input member defining an input surface and configured to translate along a first translation direction that is substantially parallel to the input surface and a second translation direction opposite to the first translation direction. The haptic button assembly may further include a support member coupled to the input member and configured to extend through a hole defined in an enclosure of the electronic device. The haptic button assembly may further include a magnetic component attached to the support member and configured to generate a magnetic flux. The haptic button assembly may further include a first conductive segment configured to pass a first electrical signal through the magnetic flux thereby causing the input member to move in the first translation direction to produce a first component of a haptic output. The haptic button assembly may further include a second conductive segment configured to pass a second electrical signal through the magnetic flux thereby causing the input member to move in the second translation direction to produce a second component of the haptic output.

Another embodiment may take the form of an electronic device comprising an enclosure, a haptic button assembly and a processing unit. The enclosure may include a sidewall that defines an opening. The haptic button assembly may include an input member positioned within the opening and defining an input surface. The haptic button assembly may further include a contact member coupled to the input member and positioned inward of the input surface. The haptic button assembly may further include a spring member positioned along a side of the contact member. The haptic button assembly may further include a conductive coil positioned along a side of the spring member opposite to the contact member. The processing unit may be configured to cause an electrical current to be applied to the conductive coil, thereby deflecting the spring member away from the contact member. The processing unit may be further configured to cause the electrical current applied to the conductive coil to be reduced or cease thereby causing the spring member to contact the contact member resulting in a haptic output at the input surface.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
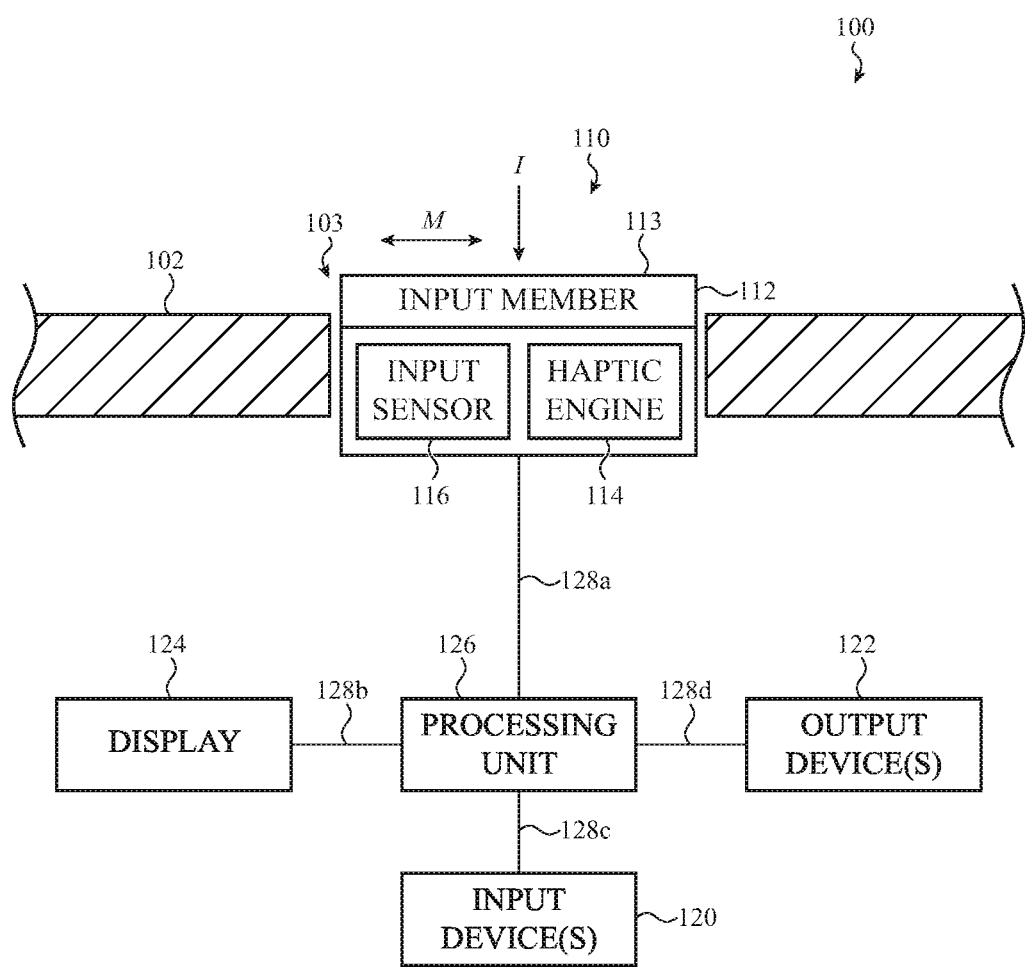
FIG. 1 is a functional block diagram of an example electronic device that incorporates a haptic button assembly.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to a haptic button assembly for detecting inputs and providing haptic outputs at an electronic device. The haptic outputs may be provided in response to detected inputs or in response to other conditions at the electronic device. The haptic button assembly may define an input surface along an exterior of the electronic device. Inputs may be provided to the input surface of the haptic button assembly. An input may include a touch input on or along the input surface and/or a force input directed substantially perpendicularly to the input surface. The haptic button assembly may provide a haptic output by causing a lateral translation of an input member of the haptic button assembly.

As used herein, a "lateral translation" generally refers to side-to-side motion and/or motion that is substantially parallel to an input surface. As used herein, items, surfaces, directions, and the like are "substantially parallel" to one another if they are parallel or within a threshold amount (e.g., 5 degrees, 10 degrees, etc.) of being parallel to one another. As used herein, items, directions, surfaces, and the like are "substantially perpendicular" to one another if they are perpendicular or within a threshold amount (e.g., 5 degrees, 10 degrees, etc.) of being perpendicular to one another.

As used herein, the term "haptic output" may refer to outputs produced by the electronic device that may be perceived through user touch. Without limitation, a haptic output may include an impulse, a vibration, or other type of movement of a surface of the electronic device that may be perceived through a touch of the user. In some cases, a haptic button assembly may vibrate, displace, and/or deflect a device component (e.g., an enclosure, a cover, or an input device) to produce a haptic output at an external surface of the device defined by the device component. In some cases, haptic outputs may be produced by relative movement of one or more device components with respect to one or more additional device components. As one example, a haptic button assembly may cause a first device component (for example, an input member) to vibrate, oscillate, rotate and/or translate relative to another device component (for example, a device enclosure) to produce a haptic output that may be perceived by a user.

Whereas traditional buttons and similar input devices may have an translating member that translates in response to an input, the haptic button assemblies described herein may not actually translate inward in response to the input, or may translate inward a very small amount that would not normally be perceivable by a user (e.g., less than 10 microns). In some cases, the haptic outputs provided by the haptic button assembly may simulate the feeling of providing input to a traditional input device. For example, the haptic button assembly may provide a haptic output in response to detecting an input to mimic the downward and/or upward travel of a traditional button press operation. To provide haptic outputs, the input member of the haptic button assembly may translate laterally a distance that is perceptible to a user (e.g., greater than 50 microns, greater than 100 microns, or more).

The haptic button assemblies described herein may include a haptic engine for providing haptic outputs by causing the input member to move or vibrate. The haptic engine may include electromagnetic components such as conduction loops and magnetic components, vibrating motors, such as eccentric rotating mass vibration motors, piezoelectric elements, and other suitable mechanisms for providing haptic outputs by causing the input member to move or vibrate.

The haptic button assembly may include one or more conduction loops and one or more magnetic components for providing haptic outputs by generating electromagnetic forces that cause the input member to move. The magnetic components or the conduction loops may be coupled to the input member. A processing unit of the electronic device may cause electrical signals (e.g., electrical current, electromagnetic signals, drive signals, and the like) to pass through the conduction loops. The electrical signals induced in the conduction loops may result in a Lorentz force that can cause the conduction loops and/or the magnetic components to move, thereby causing the input member to move. The term conduction loop may be used generally to refer to various implementations that may also be described as a coil, wire coil, conductive winding, spool, or the like. The conduction loops may include electromagnetic coils, electrically conductive coils, wire loops, other electrically conductive materials, and the like. The magnetic components may include permanent magnets, electromagnets, and the like.

The conduction loops may be attached or coupled to an enclosure of the electronic device, and the magnetic components may be attached or coupled to an actuation member that moves with the input member. In other embodiments, the magnetic components may be attached or coupled to an enclosure of the electronic device, and the conduction loops may be attached or coupled to an actuation member that moves with the input member.

Each magnetic component generates a magnetic flux. A pole of a magnetic component may be directed toward a conductive segment of a conduction loop such that the conductive segment passes through a portion of a magnetic field produced by or emanating from the pole of the magnetic component. The portion of the magnetic field that the conductive segment passes through may predominantly be composed of magnetic flux directed in a single direction (a "local flux direction"). The conductive segment may pass an electrical current through the magnetic flux in a direction that is transverse to the local flux direction. As used herein, the term "transverse" refers to directions, surfaces, lines, and the like that are not parallel and/or that extend across one another. The conductive segment may pass an electrical current through the magnetic flux in a direction that is substantially perpendicular to the local flux direction.

According to the Lorentz force law, for each conduction loop, the electrical current conducted through the magnetic flux in a direction that is transverse to the local flux direction of the magnetic flux produces a Lorentz force that is substantially perpendicular to the electrical current and the local flux direction. This Lorentz force may cause the magnetic components and/or the conduction loops to move laterally with respect to one another, thereby causing lateral translation of the input member in a direction that is substantially perpendicular to both the electrical current flowing through the segment and the magnetic flux and substantially parallel to the input surface.

The term "attached," as used herein, may be used to refer to two or more elements, structures, objects, components, parts or the like that are physically affixed, fastened, and/or retained to one another. The term "coupled," as used herein, may be used to refer to two or more elements, structures, objects, components, parts or the like that are physically attached to one another, operate with one another, communicate with one another, are in electrical connection with one another, and/or otherwise interact with one another. Accordingly, while elements attached to one another are coupled to one another, the reverse is not required. As used herein, "operably coupled" or "electrically coupled" may be used to refer to two or more devices that are coupled in any suitable manner for operation and/or communication, including wiredly, wirelessly, or some combination thereof. As used herein, the term "abutting" means that two elements share a common boundary or otherwise contact one another, while the term "adjacent" means that two elements are near one another and may (or may not) contact one another. Thus, elements that are abutting are also adjacent, although the reverse is not necessarily true.

These and other embodiments are discussed with reference to FIGS. 1-8. However, those skilled in the art will readily appreciate that the detailed description given herein with respect to these figures is for explanatory purposes only and should not be construed as limiting.

FIG. 1 is a functional block diagram of an example electronic device 100 that incorporates a haptic button assembly. The electronic device 100 may include a device enclosure 102, a haptic button assembly 110, one or more input devices 120, one or more output devices 122, a display 124, and a processing unit 126 positioned at least partially within the enclosure 102.

The haptic button assembly 110 may receive inputs and provide haptic outputs. The haptic button assembly 110 may extend at least partially through an opening 103 in the enclosure 102, such as an opening in a sidewall of the enclosure 102. The haptic button assembly 110 may be positioned beneath and/or define an input surface 113 of the electronic device 100. The haptic button assembly 110 may include an input member 112 that defines the input surface 113. The haptic button assembly 110 may further include a haptic engine 114 for producing haptic outputs at the input surface 113 and an input sensor 116 for detecting inputs to the haptic button assembly 110.

Inputs may be provided to the input surface 113 of the haptic button assembly 110. An input (e.g., input I shown in FIG. 1) may include a touch input on or along the input surface 113 and/or a force input directed substantially perpendicularly to the input surface 113. The input I may be detected by the input sensor 116 and registered as an input by the processing unit 126. The input member 112 may not translate in response to the input, or it may translate inward a very small amount that would not normally be perceivable by a user (e.g., less than 10 microns). In some cases, the haptic outputs provided by the haptic engine 114 may simulate the feeling of providing input to a traditional input device. For example, the haptic engine 114 may provide a haptic output in response to detecting an input to mimic the downward and/or upward travel of a traditional button press operation.

The input sensor 116 is operably coupled to the input surface 113 and configured to output a signal in response to detecting the input I. In various embodiments, the input sensor 116 may measure inputs using a variety of methods and techniques, including strain sensing, piezoresistive strain gauge, capacitive touch sensing, capacitive force sensing, contact sensing, electromechanical switch, electromagnetic, piezoelectric, optical, potentiometric, and so on.

The haptic engine 114 may provide haptic outputs by moving the input member 112. In some cases, the haptic engine 114 may provide a haptic output by causing a lateral translation of the input member in one or more translation directions that are substantially parallel to the input surface 113 (indicated by the line M). This motion may be substantially perpendicular to an input force applied to the input surface 113.

The haptic engine 114 may provide a first haptic output component of a haptic output by moving the input member 112 in a first direction substantially parallel to the input surface 113 and a second haptic output component of the haptic output by moving the input member in a second direction, opposite the first direction, and substantially parallel to the input surface 113. Additionally or alternatively, the haptic engine 114 may provide a haptic output by moving the input member 112 inward and/or outward substantially perpendicularly to the input surface 113, vibrating the input member 112, rotating the input member 112, oscillating the input member, and the like.

As noted herein, the haptic engine 114 may provide haptic outputs in response to inputs received at the input surface 113. The haptic engine 114 may provide different haptic outputs for different levels of input. For example, if the input is a touch input, the haptic output may be provided by moving the input member 112 in one direction. Additionally or alternatively, if the input is a force input, the haptic output may be provided by moving the input member 112 in two or more directions (e.g., back and forth) and/or vibrating the input member 112. In some cases, if the force input is below a force threshold, the haptic output may be provided by moving the input member in two or more directions, and if the force input is at or above a force threshold, the haptic output may be provided by vibrating the input member 112. The different inputs received at the input surface 113 may correspond to different functions, which may each result in operational changes of the electronic device 100, including different graphical outputs, user interface changes, and the like. The haptic outputs provided by the haptic button assembly 110 may correspond to these operational changes of the electronic device 100.

The haptic engine 114 may produce haptic outputs by generating electromagnetic forces that cause the input member 112 to move. The haptic engine 114 may include one or more conduction loops and one or more magnetic components for providing haptic outputs by generating electromagnetic forces that cause the input member 112 to move. The magnetic components or the conduction loops may be coupled to the input member 112. Electrical signals (e.g., electrical current, electromagnetic signals, drive signals, and the like) induced in and carried by the conduction loops result in a Lorentz force that can cause the conduction loops and/or the magnetic components to move, thereby causing the input member 112 to move. The conduction loops may include electromagnetic coils, electrically conductive coils, wire loops, other electrically conductive materials, and the like. The magnetic components may include permanent magnets, electromagnets, and the like. Embodiments using conduction loops and/or magnetic components are discussed in more detail with respect to FIGS. 3A-5B.

The haptic engine 114 may include a motor, an actuator, or the like for providing haptic outputs. In some cases, the haptic engine 114 may include a vibration motor, such as an eccentric rotating mass vibration motor. The motor may be positioned at least partially within or otherwise coupled to the input member 112, and may cause the input member to vibrate to provide a haptic output. Embodiments using motors are discussed in more detail with respect to FIGS. 6A-6B. The haptic engine 114 may include a piezoelectric element for providing haptic outputs. The piezoelectric element may be positioned at least partially within or otherwise coupled to the input member 112, and may cause the input member to move, deform, and/or vibrate to provide a haptic output. Embodiments using piezoelectric elements are discussed in more detail with respect to FIG. 7.

The haptic button assembly 110 may produce haptic outputs in response to receiving one or more signals from the processing unit 126. In some cases, the haptic outputs may correspond to inputs received by the electronic device 100 and/or outputs provided by the electronic device. The haptic outputs may correspond to operational states, events, or other conditions at the electronic device 100, including inputs received at the electronic device (e.g., touch inputs, rotational inputs, translational inputs), outputs of the electronic device (e.g., graphical outputs, audio outputs, haptic outputs), applications and processes executing on the electronic device, predetermined sequences, user interface commands (e.g., volume, zoom, or brightness controls, audio or video controls, scrolling on a list or page, and the like), and the like. The haptic button assembly 110 may be operably coupled to the processing unit 126 via a connector 128a and/or via one or more additional components of the electronic device 100.

Haptic outputs produced by the haptic button assembly 110 may be coordinated with an audio output of a speaker or another audio device of the electronic device 100. In some cases, the haptic button assembly 110 may produce audio outputs in addition to or as an alternative to producing haptic outputs. For example, actuation of the haptic button assembly 110 may produce a sound. Audio outputs may be produced in response to any of the conditions, inputs, or the like discussed above with respect to haptic outputs. In some cases, audio outputs and haptic outputs are produced by the same actuation or actuations of the haptic button assembly 110.

The display 124 may be positioned at least partially within the enclosure 102. The display 124 provides a graphical output, for example associated with an operating system, user interface, and/or applications of the electronic device 100. In one embodiment, the display 124 includes one or more sensors and is configured as a touch-sensitive (e.g., single-touch, multi-touch) and/or force-sensitive display to receive inputs from a user. The display 124 is operably coupled to the processing unit 126 of the electronic device 100, for example by a connector 128b. In some cases, the graphical output of the display 124 is visible along at least a portion of an external surface of the electronic device 100.

In various embodiments, a graphical output of the display 124 is responsive to inputs provided at the display and one or more additional input devices 120. For example, the processing unit 126 may be configured to modify the graphical output of the display 124 in response to receiving rotational inputs, receiving translational inputs, or receiving touch inputs. In some cases, a haptic output provided by the haptic button assembly 110 corresponds to the graphical output of the display 124. The haptic button assembly 110 may receive an input, and a graphical output of the display 124 may be changed and a haptic output may be provided in response to the input. In some cases, the haptic button assembly 110 may produce a haptic output that is coordinated with a change in the graphical output of the display 124. For example, the haptic output may be produced at or near the same time as the change in the graphical output of the display 124. In some cases, a time that the haptic output is produced overlaps a time that the graphical output of the display 124 changes.

The display 124 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 124 is positioned beneath and viewable through the cover.

Broadly, the input devices 120 may detect various types of input, and the output devices 122 may provide various types of output. While the haptic button assembly 110 may be an example of an input device 120 and/or an output device 122, the input devices 120 may generally refer to buttons, sensors, crowns, and the like, and the output devices 122 may generally refer to speakers, other haptic engines, and the like.

The processing unit 126 may be operably coupled to the input devices 120 and the output devices 122, for example by connectors 128c and 128d. The processing unit 126 may receive input signals from the input devices 120, in response to inputs detected by the input devices. The processing unit 126 may interpret input signals received from one or more of the input devices 120 and transmit output signals to one or more of the output devices 122. The output signals may cause the output devices 122 to provide one or more outputs. Detected input at one or more of the input devices 120 may be used to control one or more functions of the electronic device 100. In some cases, one or more of the output devices 122 may be configured to provide outputs that are dependent on, or manipulated in response to, the input detected by one or more of the input devices 120. The outputs provided by one or more of the output devices 122 may also be responsive to, or initiated by, a program or application executed by the processing unit 126 and/or an associated companion device. In some cases, the output devices 122 may include a speaker, and the processing unit 126 may cause the speaker to produce an audio output in conjunction with a haptic output provided using the haptic button assembly 110. Examples of suitable processing units, input devices, output devices, and displays, are discussed in more detail below with respect to FIG. 8.

Figure 2:
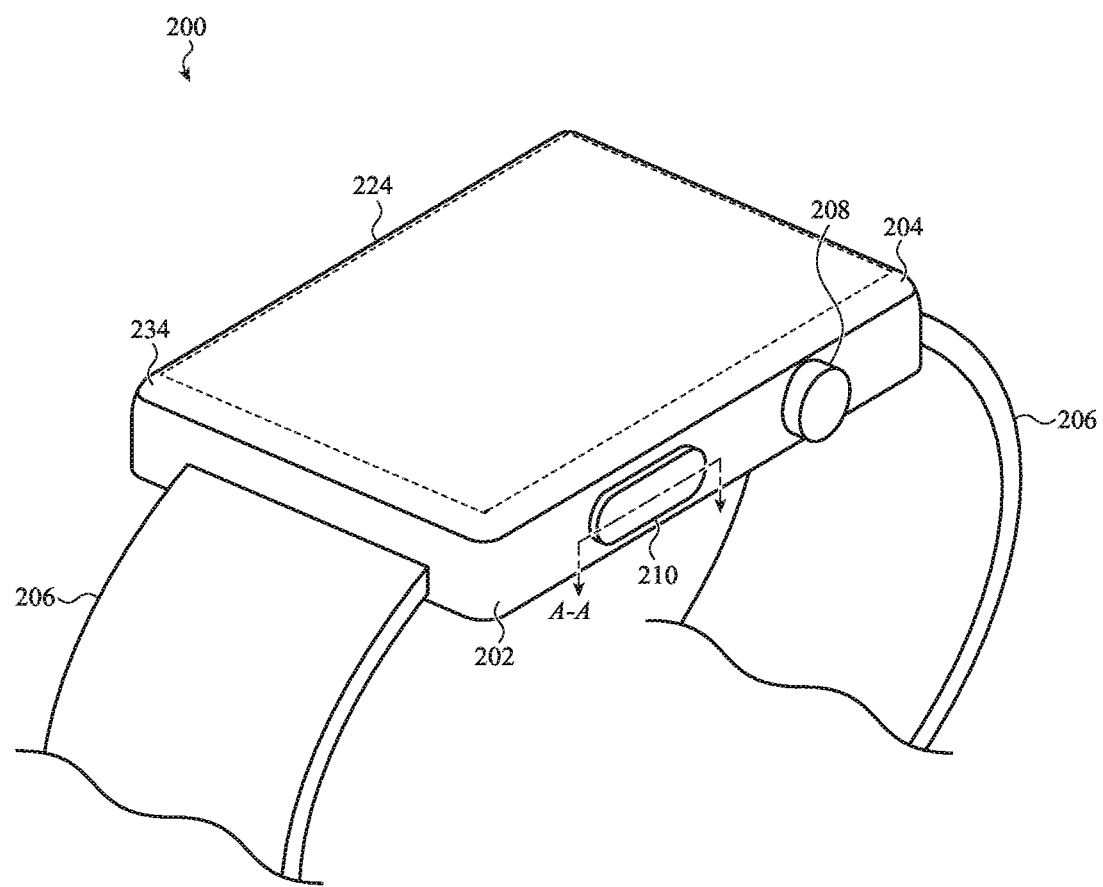
FIG. 2 illustrates an example of a watch (e.g., an electronic watch or smart watch) that may incorporate a haptic button assembly.

FIG. 2 illustrates an example watch 200 (e.g., an electronic watch or smart watch) that may incorporate a haptic button assembly. The watch 200 may include a watch body 204 and a watch band 206. Other devices that may incorporate a crown assembly include other wearable electronic devices, other timekeeping devices, other health monitoring or fitness devices, other portable computing devices, mobile phones (including smart phones), tablet computing devices, digital media players, or the like. The watch 200 may have similar components, structure, and/or functionality as the device 100 described with respect to FIG. 1. The watch 200 may provide time and timing functions, receive messages and alerts, and may track activity of a user. In some cases, the watch may monitor biological conditions or characteristics of a user.

The watch body 204 may include an enclosure 202. The enclosure 202 may include a front side enclosure member that faces away from a user's skin when the watch 200 is worn by a user, and a back side enclosure member that faces toward the user's skin. Alternatively, the enclosure 202 may include a singular enclosure member, or more than two enclosure members. The one or more enclosure members may be metallic, plastic, ceramic, glass, or other types of enclosure members (or combinations of such materials).

The enclosure 202 may include a cover sheet 234 mounted to a front side of the watch body 204 (i.e., facing away from a user's skin) and may protect a display 224 mounted within the enclosure 102. The display 224 may produce graphical output that may be viewable by a user through the cover sheet 234. In some cases, the cover sheet 234 may be part of a display stack, which display stack may include a touch sensing or force sensing capability. The display may be configured to depict a graphical output of the watch 200, and a user may interact with the graphical output (e.g., using a finger, stylus, or other pointer). As one example, the user may select (or otherwise interact with) a graphic, icon, or the like presented on the display by touching or pressing (e.g., providing touch input) on the cover sheet 234 at the location of the graphic. As used herein, the term "cover sheet" may be used to refer to any transparent, semi-transparent, or translucent surface made out of glass, a crystalline material (such as sapphire or zirconia), plastic, or the like. Thus, it should be appreciated that the term "cover sheet," as used herein, encompasses amorphous solids as well as crystalline solids. The cover sheet 234 may form a part of the enclosure 202. In some examples, the cover sheet 234 may be a sapphire cover sheet. The cover sheet 234 may also be formed of glass, plastic, or other materials.

In some embodiments, the watch body 204 may include an additional cover sheet (not shown) that forms a part of the enclosure 202. The additional cover sheet may have one or more electrodes thereon. For example, the watch body 204 may include an additional cover sheet mounted to a back side of the watch body 204 (i.e., facing toward a user's skin). The one or more electrodes on the additional cover sheet may be used to determine a biological parameter, such as a heart rate, an electrocardiogram, or the like. In some cases, the electrodes are used in combination with one or more additional electrodes, such as a surface of a crown assembly or other input device.

The watch body 204 may include at least one input device or selection device, such as a haptic button assembly, button, crown, scroll wheel, knob, dial, or the like, which input device may be operated by a user of the watch 200.

The watch 200 may include a haptic button assembly 210 similar to the haptic button assemblies described herein. The haptic button assembly 210 may be used to provide inputs to the watch 200 and to provide haptic outputs at the watch. The haptic button assembly 210 may be positioned along a portion of the enclosure 202, for example along a sidewall of the enclosure as shown in FIG. 2. In some cases, the enclosure 202 defines an opening through with a portion of the haptic button assembly extends.

In some embodiments, the watch 200 includes a crown 208. The enclosure 202 may define an opening through which a portion of the crown 208 extends. The crown 208 may be user-rotatable, and may be manipulated (e.g., rotated, pressed) by a user. The crown 208 may be mechanically, electrically, magnetically, and/or optically coupled to components within the enclosure 202, as one example. A user's manipulation of the crown 208 may be used, in turn, to manipulate or select various elements displayed on the display, to adjust a volume of a speaker, to turn the watch 200 on or off, and so on.

In some embodiments, the haptic button assembly 210, the crown 208, scroll wheel, knob, dial, or the like may be touch sensitive, conductive, and/or have a conductive surface, and a signal route may be provided between the conductive portion and a circuit within the watch body 204, such as a processing unit.

The enclosure 202 may include structures for attaching the watch band 206 to the watch body 204. In some cases, the structures may include elongate recesses or openings through which ends of the watch band 206 may be inserted and attached to the watch body 204. In other cases (not shown), the structures may include indents (e.g., dimples or depressions) in the enclosure 202, which indents may receive ends of spring pins that are attached to or threaded through ends of a watch band to attach the watch band to the watch body. The watch band 206 may be used to secure the watch 200 to a user, another device, a retaining mechanism, and so on.

In some examples, the watch 200 may lack any or all of the cover sheet 234, the display 224, the haptic button assembly 210, or the crown 208. For example, the watch 200 may include an audio input or output interface, a touch input interface, a force input or haptic output interface, or other input or output interface that does not require the display 224, the haptic button assembly 210, or the crown 208. The watch 200 may also include the aforementioned input or output interfaces in addition to the display 224, the haptic button assembly 210, or the crown 208. When the watch 200 lacks the display, the front side of the watch 200 may be covered by the cover sheet 234, or by a metallic or other type of enclosure member.

Figure 3A:
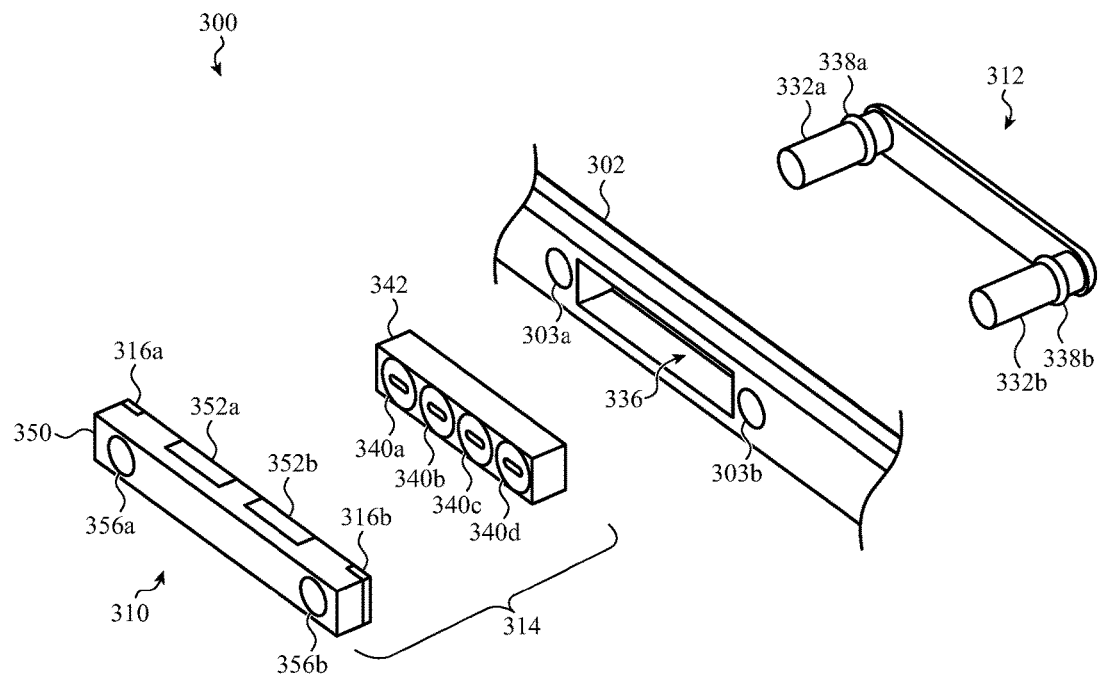
FIG. 3A illustrates a partial exploded view of an electronic device that includes a haptic button assembly having conduction loops and magnetic components for producing haptic outputs.
Figure 3B:
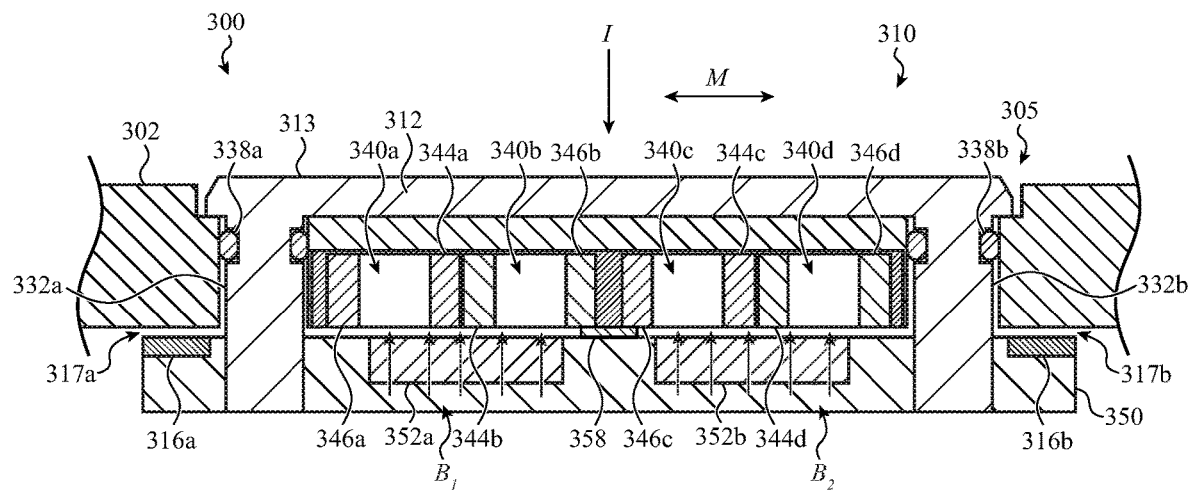
FIGS. 3B-3D are example cross-section views of the haptic button assembly installed in the electronic device of FIG. 3A.
Figure 3C:
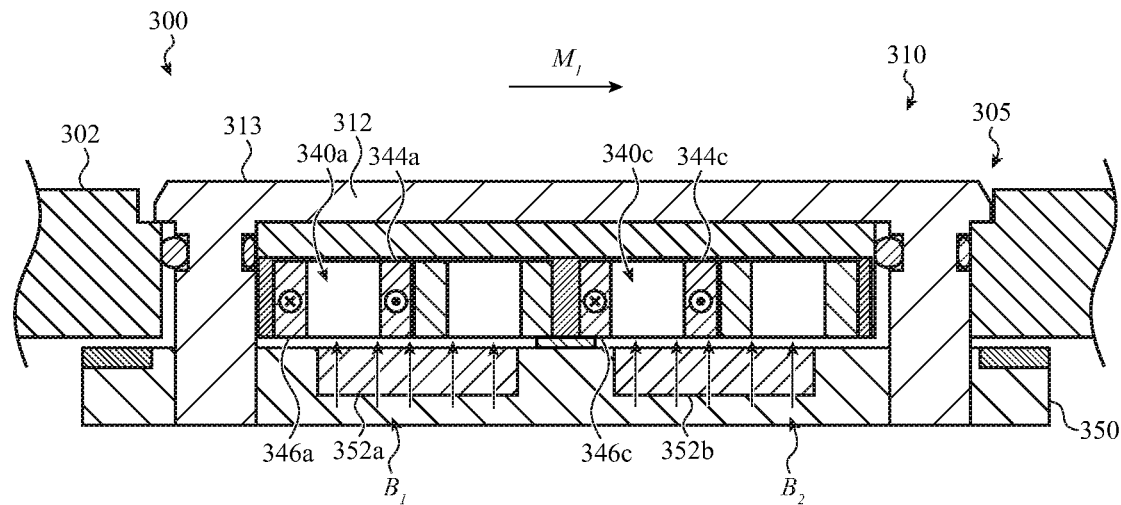
Figure 3D:
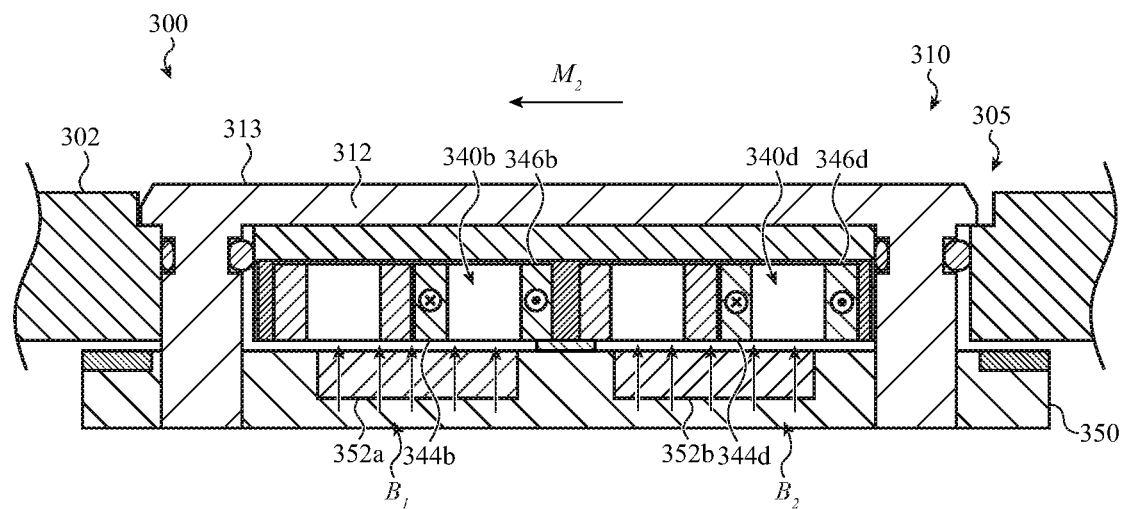

As noted herein, the haptic button assemblies described herein may produce haptic outputs by generating electromagnetic forces that cause the input member to move. FIG. 3A illustrates a partial exploded view of an electronic device 300 that includes a haptic button assembly 310 having conduction loops and magnetic components for producing haptic outputs. FIGS. 3B-3D are example cross-section views of the haptic button assembly 310 installed in the electronic device 300. FIGS. 3B-3D may represent similar views as cross-sections taken through section line A-A of FIG. 2. As shown in FIG. 3A, the haptic button assembly 310 includes an input member 312 and a haptic engine 314. The haptic engine 314 may include one or more conduction loops (e.g., conduction loops 340a-d) and an actuation member 350. The conduction loops 340a-d may conduct electrical signals that interact with one or more magnetic components (e.g., magnetic components 352a, 352b) to generate electromagnetic forces to produce haptic outputs. As noted above, the term conduction loop may be used generally to refer to various implementations that may also be described as a coil, wire coil, conductive winding, spool, or the like.

The conduction loops 340a-d may be fixed with respect to the enclosure. For example, the conduction loops 340a-d may be positioned in a pocket 336 (e.g., a recessed region) of the enclosure 332. The conduction loops 340a-d may be positioned within and/or at least partially surrounded by a loop housing 342. The conduction loops 340a-d may be at least partially encapsulated within the loop housing 342. As used herein, "encapsulated" may refer to a component that is contacted by and partially or completely surrounded by another component. For example, the conduction loops 340a-d may be encapsulated within the loop housing 342 by injection molding.

The actuation member 350 may be coupled to the input member 312 such that when the input member moves with the actuation member and vice versa. The input member 312 may include or be coupled to support members 332a, 332b that extend through holes 303a, 303b defined in of an enclosure 302 of the electronic device 300. The support members 332a, 332b may be attached or otherwise coupled to the actuation member 350. The support members 332a, 332b may extend at least partially through holes 356a, 356b defined in the actuation member 350.

Turning to FIG. 3B, the input member 312 may be positioned at least partially outside of the enclosure 302, and may define an input surface 313 along an exterior of the device 300. The input member 312 may be positioned in an opening 305 in a sidewall of the enclosure 302. As shown in FIG. 3B, the sidewall may define a recessed surface inward of the opening 305, and the holes 303a, 303b may extend through the recessed surface.

The electronic device 300 may register an input in response to a force or touch applied to the input surface 313. The haptic button assembly 310 may further include one or more input sensors 316a, 316b for detecting the inputs applied to the input surface 313. As shown in FIG. 3B, the input sensors 316a, 316b may be attached to the actuation member 350, and may be capable of detecting an input I applied to the input surface 313 (e.g., substantially perpendicular to the input surface). The input I may cause the input member 312 to move inward (e.g., downward with respect to FIG. 3B) a very small amount (e.g., less than 10 microns). This movement may not be perceivable by a user, but the input sensors 316a, 316b may be capable of detecting the movement. In some cases, each input sensors 316a, 316b detect the movement by detecting a change in the size of a gap 317a, 317b between the input sensor and the enclosure 302 or another component of the device 300. The input sensors 316a, 316b may be any suitable type of sensor, including capacitive sensors (capacitive touch sensors, capacitive force sensors, capacitive gap sensors), strain sensors, optical sensors, electromagnetic sensors, piezoelectric sensors, and the like. The input sensors 316a, 316b may be capacitive sensors capable of detecting a self-capacitance or mutual capacitance that changes based on the size of the gaps 317a, 317b.

In some cases, the input sensors 316a, 316b may be configured to detect an input in response to contact between electrodes. The actuation member 350 may include a first electrode, and a second electrode may be attached to the enclosure. One or more input sensors 316a, 316b may detect the input in response to a contact between the first electrode and the second electrode.

Once an input (e.g., an input force) is removed from the input member 312, the input member 312 may return to an unactuated position. The haptic button assembly 310 may include a restoring member for applying a restorative force to the input member 312. As one example, the haptic button assembly 310 may include a restoring member 358 positioned between the actuation member 350 and the conduction loops 340a-d. The restoring member 358 may include a spring or a compliant material that allows the actuation member 350 to move laterally, while being able to provide an upward biasing force (e.g., a restorative force) on the input member 312. The input I on the input surface 313 may cause the restoring member 358 to expand as the actuation member 350, and therefore the input sensors 316a, 316b, move away from the enclosure 302. The input sensors 316a, 316b may register this change in the position of the actuation member 350 as an input. Upon removal of the input I, the restorative force exerted by the restoring member 358 may cause the actuation member 350 and the input member 312 to return to an undepressed position. The restoring member 358 is described by way of example, and is not meant to be limiting. In other embodiments, the restoring member 358 may be positioned between the input member 312 and the enclosure 302, and may be compressed in response to the input I. Additionally or alternatively, the restoring member 358 may be positioned similarly to and/or integrated with the sealing members 338a-b discussed below.

One or more magnetic components (e.g., magnetic components 352a, 352b) may be attached or otherwise coupled to the actuation member 350. The conduction loops 340a-d and the magnetic components 352a, 352b may be used to generate a haptic output by moving the input member 312. In some cases, a haptic output may be provided in response to detecting an input at the input surface 313.

As noted above, the input member 312 may be moved laterally in one or more directions that are substantially parallel to at least a portion of the input surface 313 (e.g., left and/or right with respect to FIG. 3B as indicated by the line M). As noted above, the input member 312 may translate inward (e.g., downward with respect to FIG. 3B) a very small amount in response to the input I (e.g., less than 10 microns). This translation may be imperceptible or barely noticeable to a user. The input member 312 may translate laterally (e.g., left and/or right with respect to FIG. 3B) a larger amount that is perceptible to the user (e.g., greater than 50 microns, greater than 100 microns, or more). The haptic output produced by the lateral translation of the input member 312 may simulate a traditional button press operation so that the user perceives inward and/or outward translation of the input member 312 that is beyond the inward and/or outward translation that actually occurs.

To provide haptic outputs using the haptic button assembly 310, a processing unit of the electronic device 300 may cause electrical signals (e.g., electrical current, electromagnetic signals, drive signals, and the like) to be induced in and carried by the conduction loops 340a-d, for example by a processing unit. The electrical signals in the conduction loops 340a-d and the magnetic flux generated by the magnetic components 352a, 352b may interact to cause a resulting force, such as a Lorenz force. This force may generate a haptic output by causing the actuation member 350, and therefore the input member 312, to translate laterally.

A pole of each magnetic component 352a, 352b may face (e.g., be directed toward) one or more conductive segments 344a-d of the conduction loops 340a-d such that each conductive segment passes through a portion of a magnetic field produced by or emanating from the pole of the magnetic component. The portion of the magnetic field that the conductive segment 344a-d passes through may predominantly be composed of a localized region of magnetic flux directed in a single direction (a "local flux direction"). The local flux direction may be oriented toward the conductive segment 344a-d or away from the conductive segment and/or input surface 313, depending on the polarity of the magnetic components 352a-b. As one example, shown in FIG. 3B, the local flux direction of the localized regions of magnetic flux B1 and B2 may be directed towards the conductive segments 344a-d (e.g., upward with respect to FIG. 3B).

The conductive segments 344a-d may pass electrical signals through the localized regions of magnetic flux B1 and B2 in a direction that is transverse to the local flux direction. The conductive segments 344a-d may pass electrical signals through the localized regions of magnetic flux B1 and B2 in a direction that is substantially perpendicular to the local flux direction. The electrical signals may be carried in a direction that is substantially parallel to at least a portion of the input surface 313. For example, as shown in FIG. 3C, current conducted by the conduction loop 340a may result in current conducted by the conductive segment 344a in a direction is that is out of the page with respect to FIG. 3C, and current conducted by the conduction loop 340c may result in current conducted by the conductive segment 344c in a direction is that is out of the page with respect to FIG. 3C. Similarly, as shown in FIG. 3D, current conducted by the conduction loop 340b may result in current conducted by the conductive segment 344b in a direction is that is into the page with respect to FIG. 3D, and current conducted by the conduction loop 340d may result in current conducted by the conductive segment 344d in a direction is that is into the page with respect to FIG. 3D.

According to the Lorentz force law, for each conductive segment 344a-d, the electrical current conducted through the localized region of magnetic flux B1 and B2 of the magnetic components 352a, 352b in a direction that is transverse to the local flux direction produces a Lorentz force that is substantially perpendicular to the electrical current and the local flux direction. This Lorentz force may be substantially parallel to at least a portion of the input surface 313 (e.g., left or right with respect to FIGS. 3B-3D). The direction of the force (e.g., left or right) depends on the direction of the electrical current flowing through the conductive segments 344a-d and/or the local flux direction of the localized regions of magnetic flux B1 and B2.

The Lorentz force may cause the magnetic components 352a, 352b and/or the conduction loops 340a-d to move laterally with respect to one another, thereby causing lateral translation of the input member 312 in a direction that is transverse to both the electrical current flowing through the conductive segment and the magnetic flux and substantially parallel to the input surface 313. As shown in FIG. 3C, in the case of the conduction loops 340a and 340c, the electrical current flowing out of the page will cause the magnetic components 352a, 352b, and therefore the actuation member 350 and the input member 312, to move to the right as indicated by the arrow M1. As such, a first haptic output or haptic output component may be produced by applying electrical current to the conduction loops 340a and 340c. As shown in FIG. 3D, in the case of the conduction loops 340b and 340d, the electrical current flowing out of the page will cause the magnetic components 352a, 352b, and therefore the actuation member 350 and the input member 312, to move to the left as indicated by the arrow M2. As such, a second haptic output or haptic output component may be produced by applying electrical current to the conduction loops 340b and 340d.

As used herein, a "conductive segment" may refer to a portion of a conduction loop that may extend more than 5 degrees but less than 180 degrees around the conduction loop. While the conductive segments 344a-d are shown as solid blocks, the conductive segments may be formed from multiple round conductive elements (wires or strands) that are wrapped or wound to define the conduction loop.

The conduction loops 340a-d may be positioned relative to the magnetic components 352a, 352b such that the localized regions of magnetic flux B1 and B2 primarily interact with current flowing through the conductive segments 344a-d, and do not interact substantially with current flowing through other portions 346a-d of the conduction loops. Each magnetic component 352a, 352b may define a magnetic axis extending between the poles (e.g., up and down with respect to FIG. 3B). The local flux direction of the magnetic flux B1, B2 may be substantially parallel to the magnetic axis. A central axis of each conduction loop 340a-d may be offset from a central axis of a respective magnetic component 352a, 352b such that, for each conduction loop 340a-d, there exist one or more lines that are parallel to the magnetic axis of a magnetic component 352a, 352b, extend through the magnet, intersect the conductive segment 344a-d of the conduction loop, and do not intersect the portion 346a-d of the conduction loop. This may result in the localized regions of magnetic flux B1 and B2 primarily interacting with current flowing through the conductive segments 344a-d, even though there will also be interaction with the electrical current flowing through the portions 346a-d as well.

As shown in FIG. 3B, the positioning described above may result in a conductive segment 344a-d of each conduction loop 340a-d being positioned over one of the magnetic components and a portion 346a-d of each conduction loop not being positioned over a magnetic component. Said another way, a magnetic component 352a, 352b may vertically overlap a conductive segment of each conduction loop 340a-d, while a magnetic component may not vertically overlap other portions of each conduction loop. As shown in FIG. 3B, conductive segments 344a-d of the conduction loops 340a-d may be positioned over (or be vertically overlapped by) one of the magnetic components 352a, 352b and portions 346a-d may not be positioned over (or be vertically overlapped by) a magnetic component.

For each of the conduction loops 340a-d, all or a substantial portion of the electrical current flowing through the conductive segments 344 through the localized region of the magnetic flux may be flowing in substantially the same direction. For example, as shown in FIG. 3C, the electrical current flowing through the conductive segment 344a of the conduction loop 340a may be flowing in a direction out of the page and the electrical current flowing through the conductive segment 344c of the conduction loop 340c may be flowing in the same direction out of the page. Similarly, as shown in FIG. 3D, the electrical current flowing through the conductive segment 344b of the conduction loop 340b may be flowing in a direction into the page and the electrical current flowing through the conductive segment 344d of the conduction loop 340d may be flowing in the same direction into the page.

The magnetic flux generated by the magnetic components 352a, 352b may be oriented predominantly in a single direction in the areas near the conductive segments 344a-d. For example, as shown in FIGS. 3C and 3D, the magnetic flux B1 generated by the magnetic component 352a and the magnetic flux B2 generated by the magnetic component 352b may be directed upward with respect to FIGS. 3C and 3D. Because the conductive segments 344a-d are positioned over the magnetic components 352a, 352b, the magnetic flux B1 and B2 will predominantly interact with the electrical current flowing through the conductive segments 344a-d in the single direction (e.g., into or out of the page with respect to FIGS. 3C and 3D), even though there will also be interaction with the electrical current flowing through the portions 346a-d as well. As such, the predominant interaction between the magnetic flux generated by the magnetic components 352a, 352b and the electrical current flowing through the conduction loops 340a-b will be magnetic flux oriented in a first local flux direction interacting with electrical current flowing in a second direction transverse to the first direction.

In some cases, each conduction loop 340a-d may have electrical current induced only in one direction. Alternatively, each conduction loop 340a-d may have electrical current induced in both directions at different times or in different operational states. As such, each conduction loop 340a-d may be used to move the actuation member 350 in either direction depending on the direction of the induced electrical current. All four conduction loops 340a-d may be used to move the actuation member 350 in both directions.

The directions of electrical current and localized flux directions of the magnetic flux described with respect to FIGS. 3A-3D are illustrative and not intended to be limiting. In various embodiments, the localized flux direction of the magnetic flux and/or the direction of electrical current may be different from the examples described above. Similarly, the haptic button assembly 310 is illustrated in FIGS. 3A-3D as including two magnetic components and four conduction loops, but this is not intended to be limiting. In various embodiments, the haptic button assemblies described herein may include any number of magnetic components and conduction loops. For example, the haptic button assembly 310 may include one magnetic component or three or more magnetic components. Similarly, the haptic button assembly 310 may include one or more conduction loops. In one example embodiment, the haptic button assembly 310 may include one magnetic component and one conduction loop, and electrical current may be applied to the conduction loop in a first direction to produce a first haptic output or haptic output component and in a second direction to produce a second haptic output or haptic output component.

In the embodiments described above, the conduction loops are fixed with respect to the enclosure and the magnetic components move with the input member. However, this is not meant to be limiting, and in other embodiments, the magnetic components may be fixed with respect to the enclosure and the conduction loops may move with the input member. For example, the conduction loops may be attached to or coupled to the actuation member and configured to move in response to the force resulting from the magnetic flux of the magnetic components interacting with the electrical current flowing through the conduction loops.

As shown in FIG. 3B, a portion of the enclosure 302 may be positioned between the input surface 313 and at least a portion of the conduction loops 340a-d, or the magnetic components 352a, 352b, the actuation member 350. Similarly, at least a portion of the conduction loops 340a-d, or the magnetic components 352a, 352b, the actuation member 350 may be positioned between the first and second support members 332a, 332b. This may allow the overall size of the haptic button assembly 310 to be reduced. The haptic button assembly 310 may include one or more sealing members 338a, 338b for preventing the ingress of contaminants into the electronic device 300. The sealing members 338a, 338b may extend around the support members 332a, 332b and form a seal between the support members and the enclosure 302 when the support members are positioned in the holes 303a, 303b. The sealing members 338a, 338b may be formed of a compliant material that allows the input member 312 to translate relative to the enclosure 302 to provide haptic outputs. The sealing members 338a, 338b may be or include an elastomeric coating, adhesive, or other compliant filler material.

Figure 4:
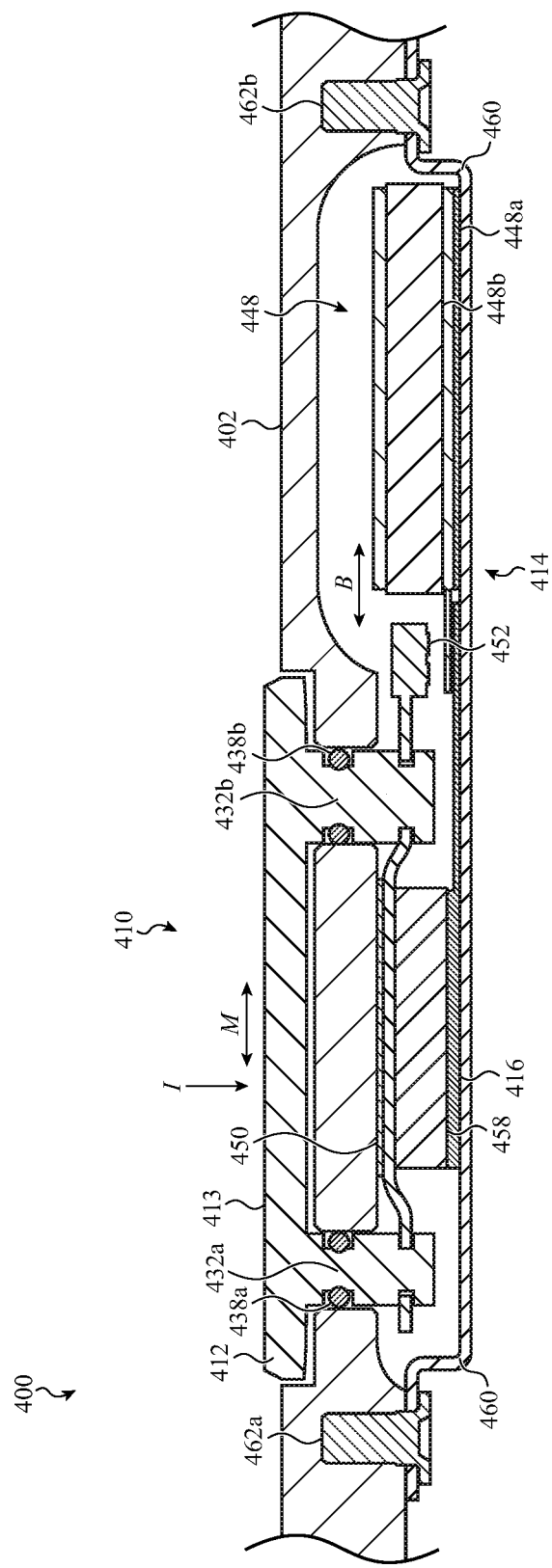
FIG. 4 is an example cross-section view of a haptic button assembly that includes an electromagnet, installed in an electronic device.

FIG. 4 is an example cross-section view of a haptic button assembly 410 that includes an electromagnet, installed in an electronic device 400. FIG. 4 may represent a similar view as a cross-section taken through section line A-A of FIG. 2. The haptic button assembly 410 may be similar to the haptic button assembly 310, and may include an input member 412 and a haptic engine 414. As shown in FIG. 4, the haptic engine 414 may be offset from the input member 412. This may provide numerous advantages, including reducing a thickness of the haptic button assembly 410.

The haptic engine 414 may include an electromagnet 448 and a magnetic component 452. The magnetic component 452 may be coupled to an actuation member 450 that is coupled to the input member (e.g., by support members 432a, 432b). The electromagnet 448 may include a ferromagnetic core 448b that extends left to right with respect to FIG. 4, and a layer of coil windings 448a wound around the core 448b.

In response to an electrical current induced in the electromagnet, the electromagnet 448 may generate a local magnetic flux that interacts with the magnetic component 452 to cause the input member 412 to move laterally (e.g., substantially parallel to the input surface 413 or left and/or right with respect to FIG. 4, as denoted by the line M). The local magnetic flux (e.g., the portion of the magnetic flux generated by the electromagnet 448 that interacts with the magnetic component 452) may be directed predominantly left and/or right with respect to FIG. 4, as denoted by the line B. This magnetic flux may either attract the magnetic component 452 toward the electromagnet 448 or repel the magnetic component 452 from the electromagnet 448. This attraction and/or repulsion causes the actuation member 450, and therefore the input member 412 to move laterally to provide a haptic output.

The electromagnet 448 may be coupled to the enclosure 402 via a bracket 460 and fasteners 462a, 462b. The haptic button assembly 410 may include one or more input sensors 416 configured to detect an input I on the input surface 413 of the input member 412. The input sensor 416 may detect inputs by detecting displacement of the actuation member 450 up and down with respect to FIG. 4. The input sensor 416 may be coupled to the bracket 460, and may be coupled to the actuation member 450 by a compliant member 458. The compliant member 458 may allow the actuation member 450 to move laterally, while providing an upward biasing force on the input member 412. The input I on the input surface 413 may cause the compliant member 458 to compress, thereby moving the actuation member 450 closer to the input sensor 416. The input sensor 416 may register this change in the position of the actuation member 450 as an input. Upon removal of the input I, the biasing force exerted by the compliant member 458 may cause the actuation member 450 to move to its original position. The input sensor 416 may be any suitable type of sensor, including capacitive sensors, optical sensors, electromagnetic sensors, piezoelectric sensors, and the like.

Similar to the haptic button assembly 310, the support members 432a, 432b may extend through holes in the enclosure 402 of the electronic device 400. The haptic button assembly 410 may include one or more sealing members 438a, 438b for preventing the ingress of contaminants into the electronic device 400. The sealing members 438a, 438b may extend around the support members 432a, 432b and form a seal between the support members and the enclosure 402 when the support members are positioned in the holes. The sealing members 438a, 438b may be formed of a compliant material that allows the input member 412 to translate relative to the enclosure 402 to provide haptic outputs.

Figure 5A:
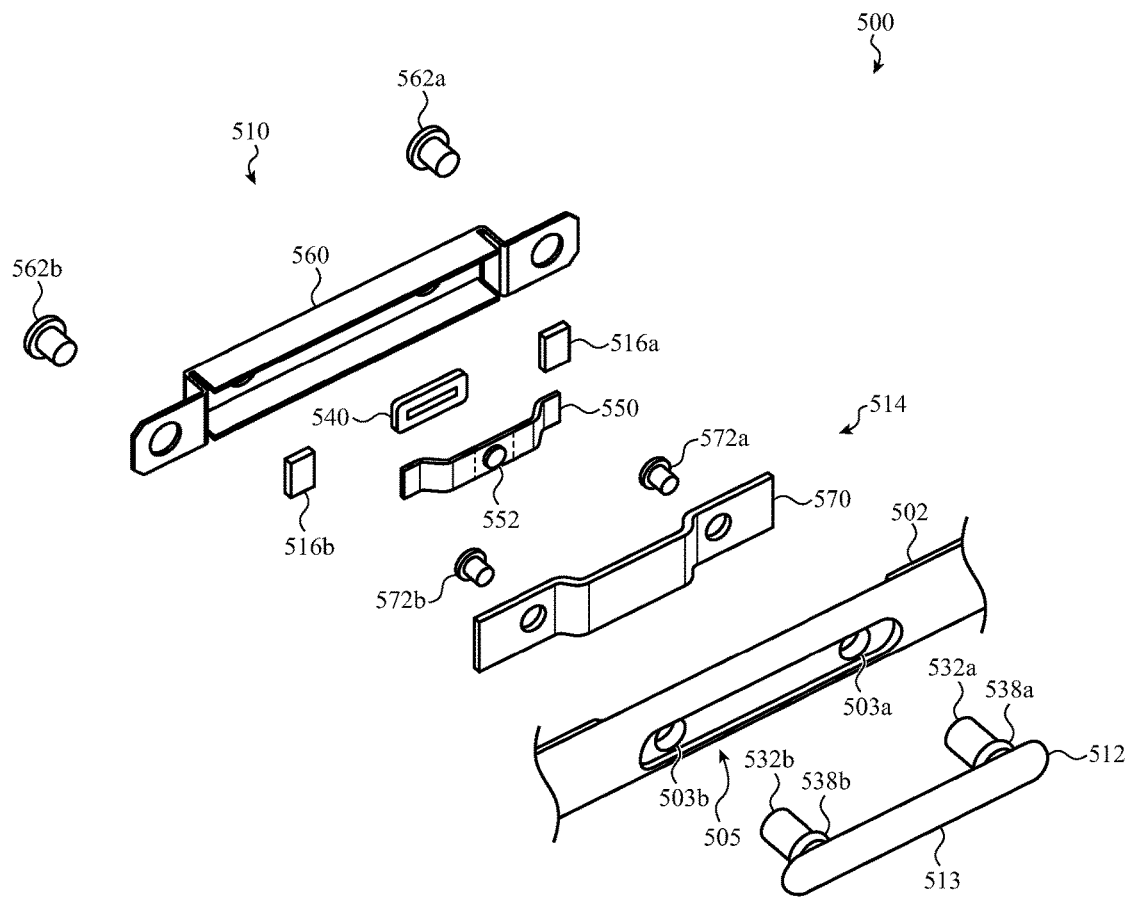
FIG. 5A illustrates a partial exploded view of an electronic device that includes a haptic button assembly for providing haptic outputs by moving an input member substantially perpendicularly to an input surface.
Figure 5B:
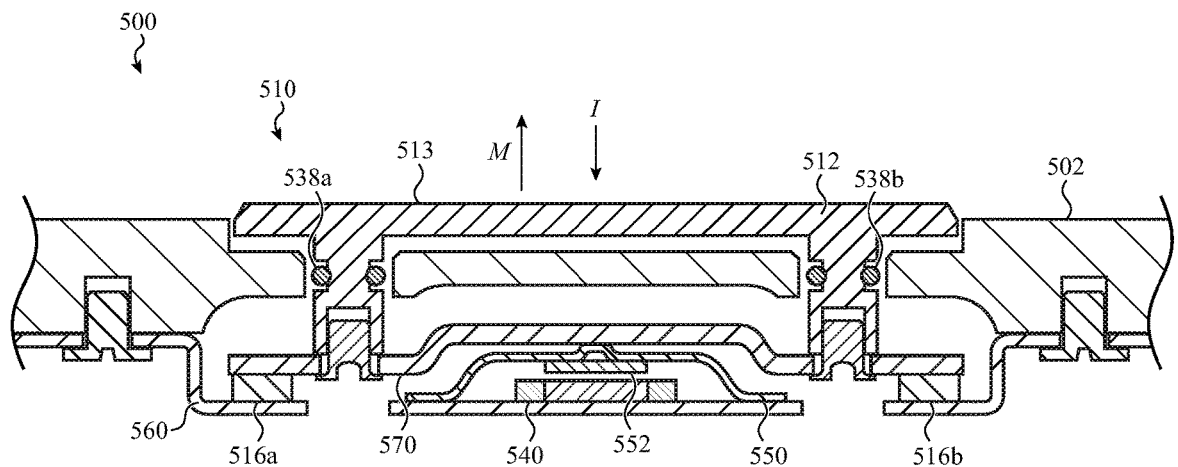
FIG. 5B is an example cross-section view of the haptic button assembly installed in the electronic device of FIG. 5A.

The haptic button assemblies 310, 410 provide haptic outputs by causing lateral translation of the input members 312, 412 in one or more translation directions that are substantially parallel to the input surfaces 313, 413, respectively. Additionally or alternatively, the haptic button assemblies described herein may provide haptic outputs by moving the input member inward and/or outward, or substantially perpendicular to the input surface. FIG. 5A illustrates a partial exploded view of an electronic device 500 that includes a haptic button assembly 510 for providing haptic outputs by moving an input member 512 substantially perpendicularly to an input surface 513. FIG. 5B is an example cross-section view of the haptic button assembly 510 installed in the electronic device 500. FIG. 5B may represent a similar view as a cross-section taken through section line A-A of FIG. 2.

As shown in FIG. 5A, the haptic button assembly 510 includes an input member 512 and a haptic engine 514. The input member 512 may be positioned in an opening 505 in a sidewall of an enclosure 502. The input member 512 may include or be coupled to support members 532a, 532b that extend through holes 503a, 503b defined in an enclosure 502 of the electronic device 500. As shown in FIG. 5A, the sidewall may define a recessed surface inward of the opening 505, and the holes 503a, 503b may extend through the recessed surface.

The input member 512 may include or be coupled to a contact member 570 positioned inward of the input surface 513 and/or within the enclosure 502. The contact member 570 may couple the input member to the enclosure 502. The support members 532a, 532b may be attached or otherwise coupled to the contact member 570, for example by fasteners 572a, 572b. At least a portion of the contact member 570 may extend between the support member 532a, 532b, and the contact member may limit an outward translation of the input member 512 by contacting the enclosure 502 or another component of the electronic device 500. The haptic button assembly 510 may include one or more input sensors 516a, 516b for detecting the inputs (e.g., an input I) applied to the input surface 513. As noted herein, the haptic outputs produced by the haptic engine 514 may be produced in response to detecting inputs on the input surface 513.

The haptic engine 514 may include a conduction loop (e.g., a conductive coil 540) and a spring member 550.

Turning to FIG. 5B, the spring member 550 may be positioned along a side of the contact member 570, and may include first and second ends that are fixed with respect to the enclosure 502. The first and second ends may be fixed with respect to the enclosure 502 by being attached or otherwise coupled to a bracket 560 that is coupled to the enclosure 502, for example by fasteners 562a, 562b. The conductive coil 540 may be positioned along a side of the spring member 550 opposite the contact member. The conductive coil 540 may be coupled to the bracket 560 and positioned between the first and second ends of the spring member 550.

The spring member 550 may include a mass element 552, for example in a middle portion of the spring member 550 between the first and second ends. The mass element 552 may be a portion of the spring member 550 itself or a separate component attached to the spring member. The mass element 552 may be or include a permanent magnet (e.g., formed of or including a magnetic material), an electromagnet, or it may be or include a ferromagnetic element (e.g., formed of or including ferromagnetic material) that does not produce a magnetic field absent the influence of another magnetic field. Example magnetic materials include, but are not limited to, magnetized iron, nickel, and/or cobalt alloys (e.g., steel), ferrite, or other suitable materials. Example ferromagnetic materials include, but are not limited to, unmagnetized iron, nickel, and/or cobalt alloys (e.g., steel), ferrite, or other suitable materials.

The conductive coil 540 may be capable of attracting a portion of the spring member 550 toward the conductive coil 540 (e.g., away from the input surface, downward with respect to FIG. 5B) in response to an electrical current being applied to the conductive coil, for example by a processing unit of the electronic device 500. The conductive coil 540 may generate a magnetic field that interacts with the mass element 552 of the spring member 550 to create magnetic attraction that draws the spring member toward the conductive coil.

Attracting the spring member 550 toward the conductive coil 540 may load the spring member 550 by moving at least a portion of the spring member 550 towards the conductive coil 540 and away from the contact member 570. In the embodiment shown in FIG. 5B, the middle portion of the spring member 550 may deflect away from the contact member 570. Additionally or alternatively, loading the spring member 550 may include compressing or otherwise deforming the spring member 550. Loading the spring member 550 results in potential energy being stored in the spring member 550. The conductive coil 540 may maintain the spring member 550 in a loaded configuration once it is loaded.

To provide a haptic output using the haptic button assembly 510, the processing unit of the electronic device 500 may cause the electrical current being applied to the conductive coil 540 to cease or be reduced. When the electrical current being applied to the conductive coil (and therefore the reluctance force) is reduced sufficiently or ceased, the spring member 550 may release from the loaded configuration and at least a portion of the spring member 550 (e.g., the middle portion) may move toward the contact member 570. Releasing the spring member may cause the potential energy stored by the spring member 550 to be converted to kinetic energy. The spring member 550 may contact the contact member 570 and apply a force to the contact member 570 by transferring at least a portion of the kinetic energy to the contact member 570. This force may cause an impulse, vibration, or other movement of the contact member 570, and therefore the input member 512, to produce a haptic output at the input surface 513. The force may cause an outward translation of the input member 512 with respect to the enclosure 502 (e.g., upward with respect to FIG. 5B). As noted above the contact member 570 may limit an outward translation of the input member 512.

The input sensors 516a, 516b may be positioned between the contact member 570 and the bracket 560, such that the input I on the input surface 513 exerts a compressive force on the input sensors 516a, 516b that is equal or proportional to a force of the input I applied to the input surface 513. The input sensors 516a, 516b may be any suitable type of sensor, including capacitive sensors, contact sensors, strain sensors, optical sensors, electromagnetic sensors, piezoelectric sensors, and the like.

The haptic button assembly 510 may include one or more sealing members 538a, 538b for preventing the ingress of contaminants into the electronic device 500. The sealing members 538a, 538b may extend around the support members 532a, 532b and form a seal between the support members and the enclosure 502 when the support members are positioned in the holes 503a, 503b. The sealing members 538a, 538b may be formed of a compliant material that allows the input member 512 to move relative to the enclosure 502 to provide haptic outputs.

Figure 6A:
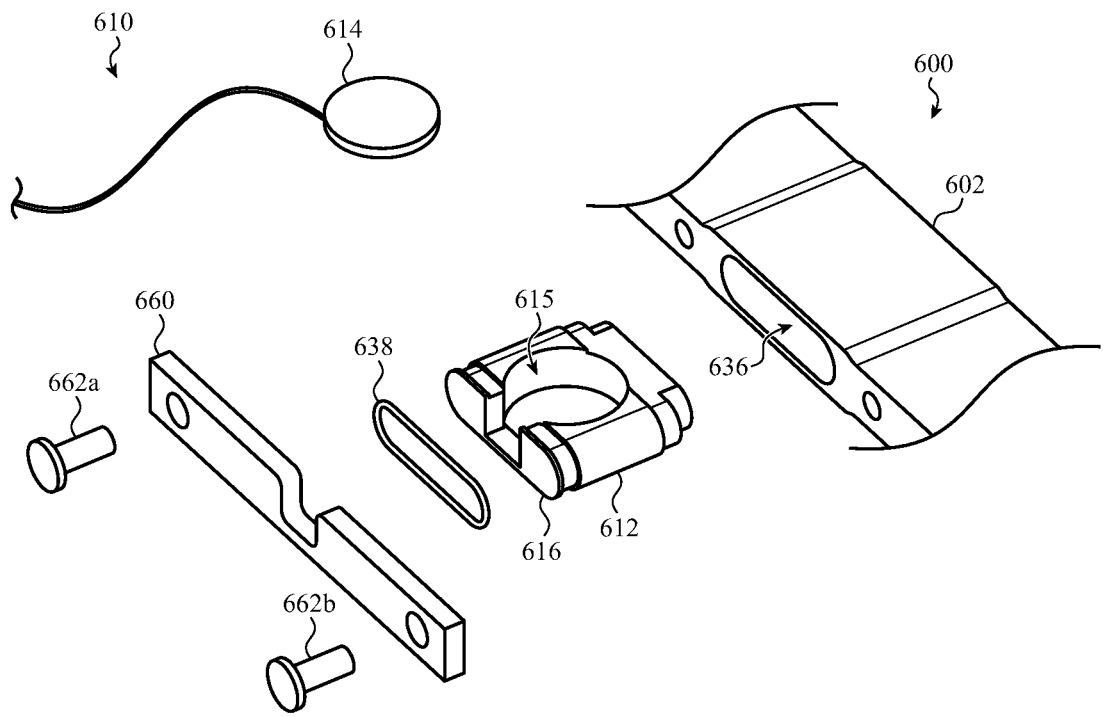
FIG. 6A illustrates a partial exploded view of an electronic device that includes a haptic button assembly having an eccentric rotating mass vibration motor.
Figure 6B:
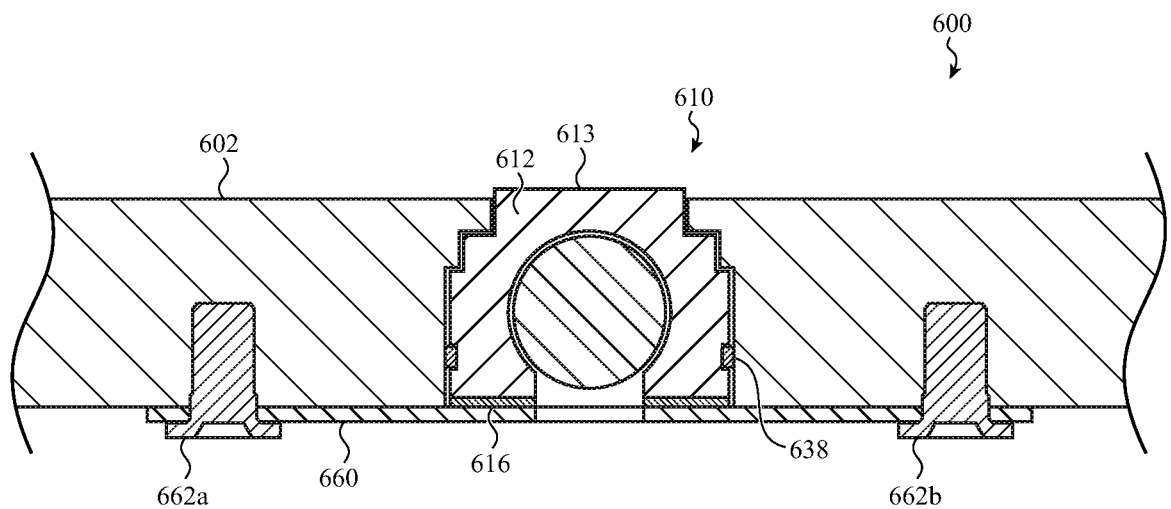
FIG. 6B is an example cross-section view of the haptic button assembly installed in the electronic device of FIG. 6A.

As noted above, the haptic engine of the haptic button assemblies described herein may include a vibration motor, such as an eccentric rotating mass vibration motor. FIG. 6A illustrates a partial exploded view of an electronic device 600 that includes a haptic button assembly 610 having an eccentric rotating mass vibration motor. FIG. 6B is an example cross-section view of the haptic button assembly 610 installed in the electronic device 600. FIG. 6B may represent a similar view as a cross-section taken through section line A-A of FIG. 2.

The haptic button assembly 610 may include an input member 612 and a haptic engine 614. The haptic engine 614 may include an eccentric rotating mass vibration motor for providing haptic outputs at an input surface of the input member. The haptic engine 614 may cause the input member 612 to vibrate to provide haptic outputs at the input surface 613. The haptic engine 614 may be positioned in a recess 615 in the input member 612. The input member 612 may extend at least partially through an opening 636 in an enclosure 602 of the electronic device 600. The input member 612 may be retained in the opening 636 by a bracket 660, for example using fasteners 662a, 662b.

The haptic button assembly 610 may include one or more input sensors 616 for detecting the inputs applied to the input surface 613. The input sensor 616 may detect an input I applied to the input surface 613. The input sensor 616 may be positioned between the input member 612 and the bracket 660, such that the input I on the input surface 613 exerts a compressive force on the input sensor 616 that is equal or proportional to a force of the input I applied to the input surface 613. The input sensor 616 may be any suitable type of sensor, including capacitive sensors, contact sensors, strain sensors, optical sensors, electromagnetic sensors, piezoelectric sensors, and the like.

The haptic button assembly 610 may include one or more sealing members 638 for preventing the ingress of contaminants into the electronic device 600. The sealing member 638 may extend around the input member 612 and form a seal between the input member and the enclosure 602 when the input member is positioned in the opening 636. The sealing member 638 may be formed of a compliant material that allows the input member 612 to vibrate relative to the enclosure 602 to provide haptic outputs.

Figure 7:
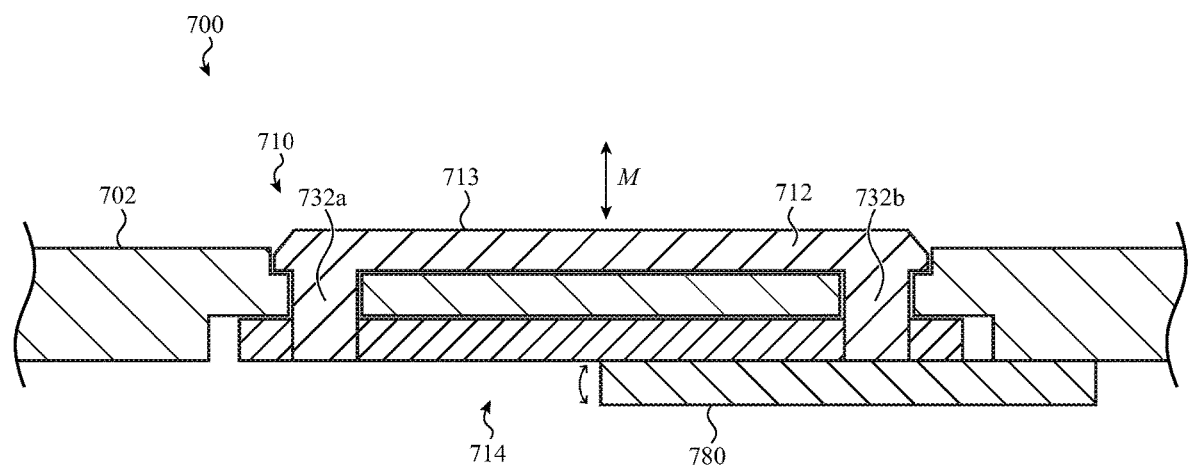
FIG. 7 is an example cross-section view of a haptic button assembly having a piezoelectric element for providing haptic outputs, installed in an electronic device.

As noted above, the haptic engine of the haptic button assemblies described herein may include a piezoelectric element for providing haptic outputs. FIG. 7 is an example cross-section view of a haptic button assembly 710 having a piezoelectric element for providing haptic outputs, installed in an electronic device 700. FIG. 7 may represent a similar view as a cross-section taken through section line A-A of FIG. 2. The haptic button assembly 710 may include an input member 712 and a haptic engine 314. The haptic engine 714 may include a piezoelectric element 780 and an actuation member 750.

The actuation member 750 may be coupled to the input member 712 such that when the input member moves with the actuation member and vice versa. The input member 712 may include or be coupled to support members 732a, 732b that extend through holes defined in an enclosure 702 of the electronic device 700. The support members 732a, 732b may be attached or otherwise coupled to the actuation member 750. The support members 732a, 732b may extend at least partially through holes defined in the actuation member 750.

The piezoelectric element 780 may be attached or otherwise coupled to the enclosure 702. The piezoelectric element 780 may be configured to actuate in response to an electrical signal (e.g., a voltage) being applied to the piezoelectric element. The piezoelectric element 780 may be attached or otherwise coupled to the actuation member 750 such that actuation of the piezoelectric element 780 causes the actuation member 750, and therefore the input member 712 to move, thereby producing a haptic output at the input surface 713.

The piezoelectric element 780 may actuate in a variety of ways to produce haptic outputs at the input surface 713. The piezoelectric element may define a longitudinal axis that is substantially parallel to the input surface 713 (e.g., left to right with respect to FIG. 7). In response to a voltage applied across the longitudinal axis of the piezoelectric element 780, the piezoelectric element may deflect in a direction that is substantially perpendicular to the longitudinal axis, which may result in movement of the input member 712 that is substantially perpendicular to the input surface 713 (e.g., up and/or down with respect to FIG. 7 as indicated by arrow M).

In other embodiments, the piezoelectric element 780 may elongate and/or contract along the longitudinal axis to provide haptic outputs. In response to a voltage applied along the longitudinal axis of the piezoelectric element 780, the piezoelectric element may elongate and/or contract along a direction that is substantially parallel to the longitudinal axis, which may result in movement of the input member 712 that is substantially parallel to the input surface 713 (e.g., left and/or right with respect to FIG. 7).

Figure 8:
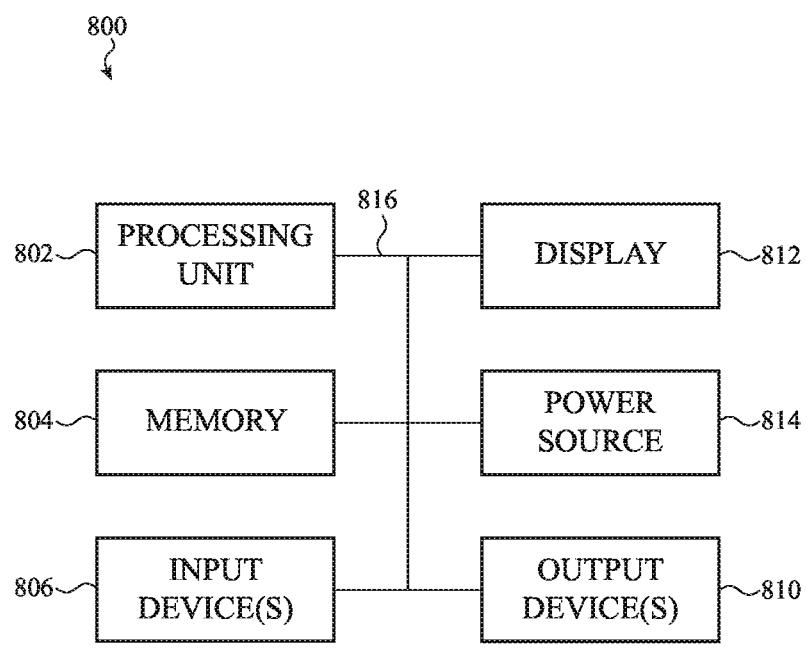
FIG. 8 illustrates a sample electrical block diagram of an electronic device that may incorporate a haptic button assembly.

FIG. 8 illustrates a sample electrical block diagram of an electronic device 800 that may incorporate a haptic button assembly. The electronic device may in some cases take the form of any of the electronic devices described with reference to FIGS. 1-7, or other portable or wearable electronic devices. The electronic device 800 can include a display 812 (e.g., a light-emitting display), a processing unit 802, a power source 814, a memory 804 or storage device, an input device 806 (e.g., a haptic button assembly), and an output device 810.

The processing unit 802 can control some or all of the operations of the electronic device 800. The processing unit 802 can communicate, either directly or indirectly, with some or all of the components of the electronic device 800. For example, a system bus or other communication mechanism 816 can provide communication between the processing unit 802, the power source 814, the memory 804, the input device(s) 806, and the output device(s) 810.

The processing unit 802 can be implemented as any electronic device capable of processing, receiving, or transmitting data or instructions. For example, the processing unit 802 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 800 can be controlled by multiple processing units. For example, select components of the electronic device 800 (e.g., an input device 806) may be controlled by a first processing unit and other components of the electronic device 800 (e.g., the display 812) may be controlled by a second processing unit, where the first and second processing units may or may not be in communication with each other. In some cases, the processing unit 802 may determine a biological parameter of a user of the electronic device, such as an ECG for the user.

The power source 814 can be implemented with any device capable of providing energy to the electronic device 800. For example, the power source 814 may be one or more batteries or rechargeable batteries. Additionally or alternatively, the power source 814 can be a power connector or power cord that connects the electronic device 800 to another power source, such as a wall outlet.

The memory 804 can store electronic data that can be used by the electronic device 800. For example, the memory 804 can store electrical data or content such as, for example, audio and video files, documents and applications, device settings and user preferences, timing signals, control signals, and data structures or databases. The memory 804 can be configured as any type of memory. By way of example only, the memory 804 can be implemented as random access memory, read-only memory, Flash memory, removable memory, other types of storage elements, or combinations of such devices.

In various embodiments, the display 812 provides a graphical output, for example associated with an operating system, user interface, and/or applications of the electronic device 800. In one embodiment, the display 812 includes one or more sensors and is configured as a touch-sensitive (e.g., single-touch, multi-touch) and/or force-sensitive display to receive inputs from a user. For example, the display 812 may be integrated with a touch sensor (e.g., a capacitive touch sensor) and/or a force sensor to provide a touch- and/or force-sensitive display. The display 812 is operably coupled to the processing unit 802 of the electronic device 800.

The display 812 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 812 is positioned beneath and viewable through a cover that forms at least a portion of an enclosure of the electronic device 800.

In various embodiments, the input devices 806 may include any suitable components for detecting inputs. Examples of input devices 806 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 806 may be configured to detect one or more particular types of input and provide a signal (e.g., an input signal) corresponding to the detected input. The signal may be provided, for example, to the processing unit 802.

As discussed above, in some cases, the input device(s) 806 include a touch sensor (e.g., a capacitive touch sensor) integrated with the display 812 to provide a touch-sensitive display. Similarly, in some cases, the input device(s) 806 include a force sensor (e.g., a capacitive force sensor) integrated with the display 812 to provide a force-sensitive display.

The output devices 810 may include any suitable components for providing outputs. Examples of output devices 810 include audio output devices (e.g., speakers), visual output devices (e.g., lights or displays), haptic output devices (e.g., haptic output devices), communication devices (e.g., wired or wireless communication devices), and so on, or some combination thereof. Each output device 810 may be configured to receive one or more signals (e.g., an output signal provided by the processing unit 802) and provide an output corresponding to the signal.

In some cases, input devices 806 and output devices 810 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 802 may be operably coupled to the input devices 806 and the output devices 810. The processing unit 802 may be adapted to exchange signals with the input devices 806 and the output devices 810. For example, the processing unit 802 may receive an input signal from an input device 806 that corresponds to an input detected by the input device 806. The processing unit 802 may interpret the received input signal to determine whether to provide and/or change one or more outputs in response to the input signal. The processing unit 802 may then send an output signal to one or more of the output devices 810, to provide and/or change outputs as appropriate.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. An electronic device comprising:
   an enclosure comprising a sidewall, the sidewall defining an opening;
   a haptic button assembly comprising:
      an input member positioned at least partially within the opening and defining an input surface; and
      a haptic actuation system comprising:
         a magnet configured to generate a magnetic flux; and
         a conductive coil positioned at least partially in the magnetic flux of the magnet, at least one of the magnet or the conductive coil coupled to the input member;
   a switch configured to be actuated in response to a user input applied to the input surface; and
   a processing unit positioned in the enclosure and configured to actuate the haptic actuation system, causing a lateral translation of the input member in a translation direction that is parallel to the input surface, thereby producing a haptic output.

2. The electronic device of claim 1, wherein:
   the translation direction is a first translation direction; and
   the input member is configured to translate along a second translation direction that is perpendicular to the input surface in response to the user input.

3. The electronic device of claim 2, wherein the translation of the input member along the second translation direction causes the switch to be actuated.

4. The electronic device of claim 2, wherein:
   the electronic device further comprises:
      a display at least partially within the enclosure; and
      a transparent cover over the display and defining a front side of the electronic device; and
   the sidewall has:
      a height dimension extending from the front side of the electronic device to a back side of the electronic device; and
      a length dimension perpendicular to the height dimension.

5. The electronic device of claim 4, wherein the translation direction of the input member is parallel to the length dimension of the sidewall.

6. The electronic device of claim 4, wherein:
   the height dimension is a first height dimension;
   the length dimension is a first length dimension; and
   the input member has:
      a second height dimension parallel to the first height dimension; and
      a second length dimension, parallel to the first length dimension, the second length dimension greater than the second height dimension.

7. The electronic device of claim 1, wherein:
the conductive coil is a first conductive coil;
actuating the haptic actuation system includes causing a first electrical current to conduct through the conductive coil;
the lateral translation is a first lateral translation;
the translation direction is a first translation direction;
the haptic actuation system further comprises a second conductive coil positioned at least partially in the magnetic flux of the magnet; and
the processing unit is further configured to actuate the haptic actuation system by causing a second electrical current to conduct through the second conductive coil, causing a second lateral translation of the input member in a second translation direction opposite to the first translation direction.

8. The electronic device of claim 1, wherein:
actuating the haptic actuation system includes causing a first electrical current to conduct through the conductive coil;
the lateral translation is a first lateral translation;
the translation direction is a first translation direction;
the processing unit is further configured to cause a second electrical current to conduct through the conductive coil in a second current direction opposite to a first current direction of the first electrical current; and
the second electrical current causes a second lateral translation of the input member in a second translation direction opposite to the first translation direction.

9. The electronic device of claim 1, wherein:
the user input causes the input member to translate less than ten microns; and
actuating the haptic actuation system causes the input member to translate more than one hundred microns.

10. A haptic button assembly for an electronic device, comprising:
an input member defining an input surface and configured to translate along a first translation direction that is substantially parallel to the input surface and a second translation direction opposite to the first translation direction;
a magnetic component configured to generate a magnetic flux;
a first conductive segment configured to pass a first electrical signal through the magnetic flux, thereby causing the input member to move in the first translation direction; and
a second conductive segment configured to pass a second electrical signal through the magnetic flux, thereby causing the input member to move in the second translation direction.

11. The haptic button assembly of claim 10, wherein:
the first conductive segment is a first portion of a first conduction loop; and
the second conductive segment is a second portion of a second conduction loop.

12. The haptic button assembly of claim 10, wherein the first conductive segment and the second conductive segment are positioned between the input member and the magnetic component.

13. The haptic button assembly of claim 10, wherein:
the haptic button assembly further comprises an input sensor configured to detect an input at the input surface; and
the haptic button assembly is configured to produce the movement in the first translation direction and the movement in the second translation direction in response to the input.

14. The haptic button assembly of claim 10, wherein:
the magnetic component is a first magnetic component;
the magnetic flux is a first magnetic flux; and
the haptic button assembly further comprises:
a second magnetic component configured to generate a second magnetic flux;
a third conductive segment configured to pass a third electrical signal through the second magnetic flux; and
a fourth conductive segment configured to pass a fourth electrical signal through the second magnetic flux.

15. An electronic device comprising:
an enclosure comprising a sidewall;
a haptic button assembly comprising:
an input member positioned along the sidewall of the enclosure and defining an input surface, the input member configured to translate in a direction parallel to the input surface;
an input sensor configured to detect an input applied to the input member; and
a haptic actuation system comprising:
a magnet configured to produce a magnetic flux; and
a conductive coil positioned at least partially within the magnetic flux, the haptic actuation system configured to, in response to the input sensor detecting the input, cause an actuation signal to be transmitted to the haptic button assembly, thereby causing the input member to translate in the direction.

16. The electronic device of claim 15, wherein:
the direction is a first direction;
the input member is further configured to translate in a second direction perpendicular to the input surface; and
the input comprises an input force applied to the input member along the second direction.

17. The electronic device of claim 16, wherein the input sensor comprises an electromechanical switch.

18. The electronic device of claim 16, wherein the input sensor comprises a force sensor.

19. The electronic device of claim 15, wherein:
the enclosure defines a hole surface defining a hole extending through the sidewall;
the input member defines a post extending into the hole; and
the electronic device further comprises a sealing member positioned between and in contact with the hole surface and the post.

20. The electronic device of claim 19, wherein the translation of the input member in the direction compresses the sealing member, thereby deforming the sealing member.

* * * * *